US008203739B2

(12) United States Patent
Nakamura

(10) Patent No.: US 8,203,739 B2
(45) Date of Patent: Jun. 19, 2012

(54) PRINTING SYSTEM

(75) Inventor: Tomoki Nakamura, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 728 days.

(21) Appl. No.: 12/344,727

(22) Filed: Dec. 29, 2008

(65) Prior Publication Data

US 2009/0168102 A1 Jul. 2, 2009

(30) Foreign Application Priority Data

Dec. 28, 2007 (JP) ................................. 2007-339237

(51) Int. Cl.
*G06F 15/00* (2006.01)
*G06F 15/16* (2006.01)
(52) U.S. Cl. ........................ 358/1.15; 709/206
(58) Field of Classification Search .............. 358/1.15, 358/1.14, 1.13, 1.18, 3.28, 1.12, 438, 474, 358/403, 426.02, 452; 709/219, 217, 223, 709/201, 227, 206; 379/88.14, 88.16, 93.02; 370/352, 493, 465
See application file for complete search history.

(56) References Cited

U.S. PATENT DOCUMENTS 7,283,258 B1 10/2007 Kuno et al.
7,936,482 B2 * 5/2011 Takezaki et al. ............. 358/3.28

FOREIGN PATENT DOCUMENTS

| JP | 10-305644 | 11/1998 |
| JP | 2000-071582 | 3/2000 |
| JP | 2006-227846 | 8/2006 |

* cited by examiner

*Primary Examiner* — Saeid Ebrahimi Dehkordy
(74) *Attorney, Agent, or Firm* — Scully, Scott Murphy & Presser, PC

(57) ABSTRACT

A printing system includes a printing device and a printing data processing device. The printing device is configured to perform printing. The printing device includes a status data generating unit that generates status data indicating a status of the printing device. The printing data processing device includes a status text storing unit, a first voicing unit, an acquiring unit, and an inputting unit. The status text storing unit stores status text data corresponding to the status data. The status text data explanatorily indicates the status of the printing device corresponding to the status data with words. The acquiring unit acquires the status text data corresponding to the status data from the status text storing unit. The inputting unit inputs voicing text data that is based on the acquired status text data into the first voicing unit. The first voicing unit voices text based on the inputted voicing text data.

20 Claims, 13 Drawing Sheets

FIG.12

| STATUS CODE | DISPLAY STATUS TEXT | MAIN VOICING STATUS TEXT | SUB VOICING STATUS TEXT |
|---|---|---|---|
| 「10001」 | READY | READY | — |
| 「10006」 | OUT OF INK, SOON | PRINTER IS OUT OF INK, SOON | PRINTER IS OUT OF INK, SOON |
| 「40021」 | PAPER JAM | PAPER JAM | PAPER IS REMAINED TO BE JAMMED |
| 「40038」 | OUT OF INK | OUT OF INK | PLEASE REPLENISH INK |
| 「41000」 | OUT OF PAPER | PRINTER IS OUT OF PAPER, PLEASE LOAD MORE PAPER | PLEASE LOAD MORE PAPER |
| 「41201」 | COVER IS OPEN | COVER IS OPEN, PLEASE CLOSE COVER | PLEASE CLOSE COVER |
| ... | ... | ... | ... |

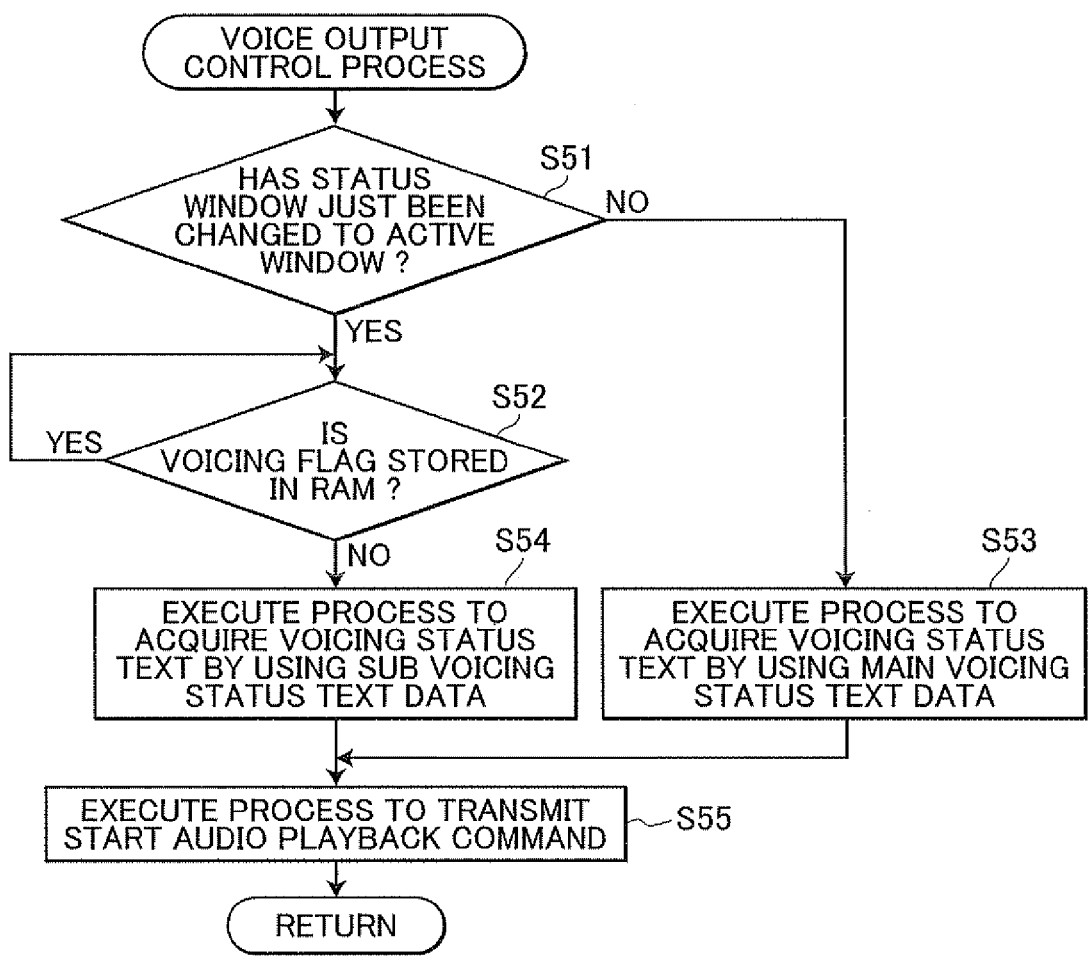

PRINTING SYSTEM

CROSS REFERENCE TO RELATED APPLICATION

This application claims priority from Japanese Patent Application No. 2007-339237 filed Dec. 28, 2007. The entire content of the priority application is incorporated herein by reference.

TECHNICAL FIELD

The invention relates to a printing system comprising a printing device capable of executing desired printing operations with consumables, and a print data processor and a control program for a printing system capable of acquiring data indicating the status of the printer. The invention particularly relates to a printing system and to a control program for the printing system capable of reporting the status of the printing device based on the acquired status through a screen display and voiced output.

BACKGROUND

A printing system well known in the art acquires status data from a printer indicating the status of the printer, and displays this status based on the acquired data on a display unit. By viewing this display, a user can determine the status of the printer, i.e., whether the printer is in a condition capable of printing the job, and can take appropriate measures when the printer is unable to execute the printing operation.

One such printing system is disclosed in Japanese patent application publication No. 2000-071582. This printing system reports the quantity of residual ink in the printer. Specifically, prior to printing print data, the printing system acquires a quantity of residual ink in the printer as status data. The printing system also estimates the quantity of ink necessary for executing a printing operation based on the print data and displays the estimated quantity of ink together with the quantity of residual ink in a graph on the display unit. Accordingly, if there is insufficient ink for executing the printing operation based on the print data, for example, the printing system described in Japanese patent application publication No. 2000-071582 can notify the user prior to printing the print data that the operation cannot be executed until ink is replenished.

SUMMARY

The conventional printing system described above always reports the quantity of residual ink and other data related to the printer status to the user on the display unit. Therefore, the user cannot take appropriate measures on the printer if the user cannot view information on printer conditions displayed on the display unit.

However, this type of printing system is used not only by people who are physically unimpaired, but in some cases by visually impaired users, such as users with weak eyesight. Since the conventional printing system described above reports conditions of the printer only through the display unit, the conventional system cannot reliably report the conditions of the printer to visually impaired users and the like.

Today, voicing software capable of recognizing text data and outputting the text as voice is well known in the art. This voicing software, referred to as a "screen reader," is used by physically impaired users who are physically unable to read displayed text and children, foreign citizens, and the like who have difficulty reading the displayed language. Here, the voicing software is configured of voicing only an object that is selected by the user and thus that is acceptable the user input operation, for example, an active window, a control that is focused.

Further, this voicing software voices only targets selected by user operations. Therefore, if the status of the printer changes, there is often a considerable delay from the time the status change occurs to the time the status change is reported by voice. In some cases, changes in the status of the printer are not reported by voice if the changed item is not selected through a user operation. By not learning the status of the printer in such cases, the user is placed at a great disadvantage, and the possibility of this problem occurring increases dramatically when the user is visually impaired.

In view of the foregoing, it is an object of the invention to provide a printing system capable of accurately reporting the state of a printer to every user.

In order to attain the above and other objects, the invention provides a printing system. The printing system includes a printing device and a printing data processing device. The printing device is configured to perform printing operation by using consumables. The printing device includes a status data generating unit and a transferring unit. The status data generating unit generates status data indicating a status of the printing device. The transferring unit transfers the status data. The printing data processing device includes a receiving unit, a status text storing unit, a first voicing unit, an acquiring unit, and an inputting unit. The receiving unit receives the status data from the transferring unit. The status text storing unit stores status text data corresponding to the status data. The status text data explanatorily indicates the status of the printing device corresponding to the status data with words. The first voicing unit voices text. The acquiring unit acquires the status text data corresponding to the status data from the status text storing unit. The inputting unit inputs voicing text data that is based on the acquired status text data into the first voicing unit. The first voicing unit voices text based on the inputted voicing text data.

According to another aspects, the invention provides a computer-readable storage medium storing a set of program instructions executed by a computer for controlling a printing system that includes a printing device and a printing data processing device. The printing device is configured to perform printing operation by using consumables. The printing device includes a status data generating unit and a transferring unit. The status data generating unit generates status data indicating a status of the printing device. The transferring unit transfers the status data. The printing data processing device includes a receiving unit and a status text storing unit. The receiving unit receives the status data from the transferring unit. The status text storing unit stores status text data corresponding to the status data. The status text data explanatorily indicates the status of the printing device corresponding to the status data with words. The program instructions includes (a) voicing text, (b) acquiring the status text data corresponding to the status data from the status text storing unit, and (c) inputting voicing text data that is based on the acquired status text data into the voicing instruction (a). The voicing instruction (a) voices text based on the inputted voicing text data.

BRIEF DESCRIPTION OF THE DRAWINGS

Embodiments in accordance with the invention will be described in detail with reference to the following figures wherein:

FIG. 12 is a explanatory diagram showing a status database;

FIG. 15 is a flowchart illustrating steps in a voice output control process according to a second embodiment.

DETAILED DESCRIPTION

First Embodiment

Next, a first embodiment of a printing system and a control program for a printing system according to the invention will be described while referring to the accompanying drawings.

Figure 1:
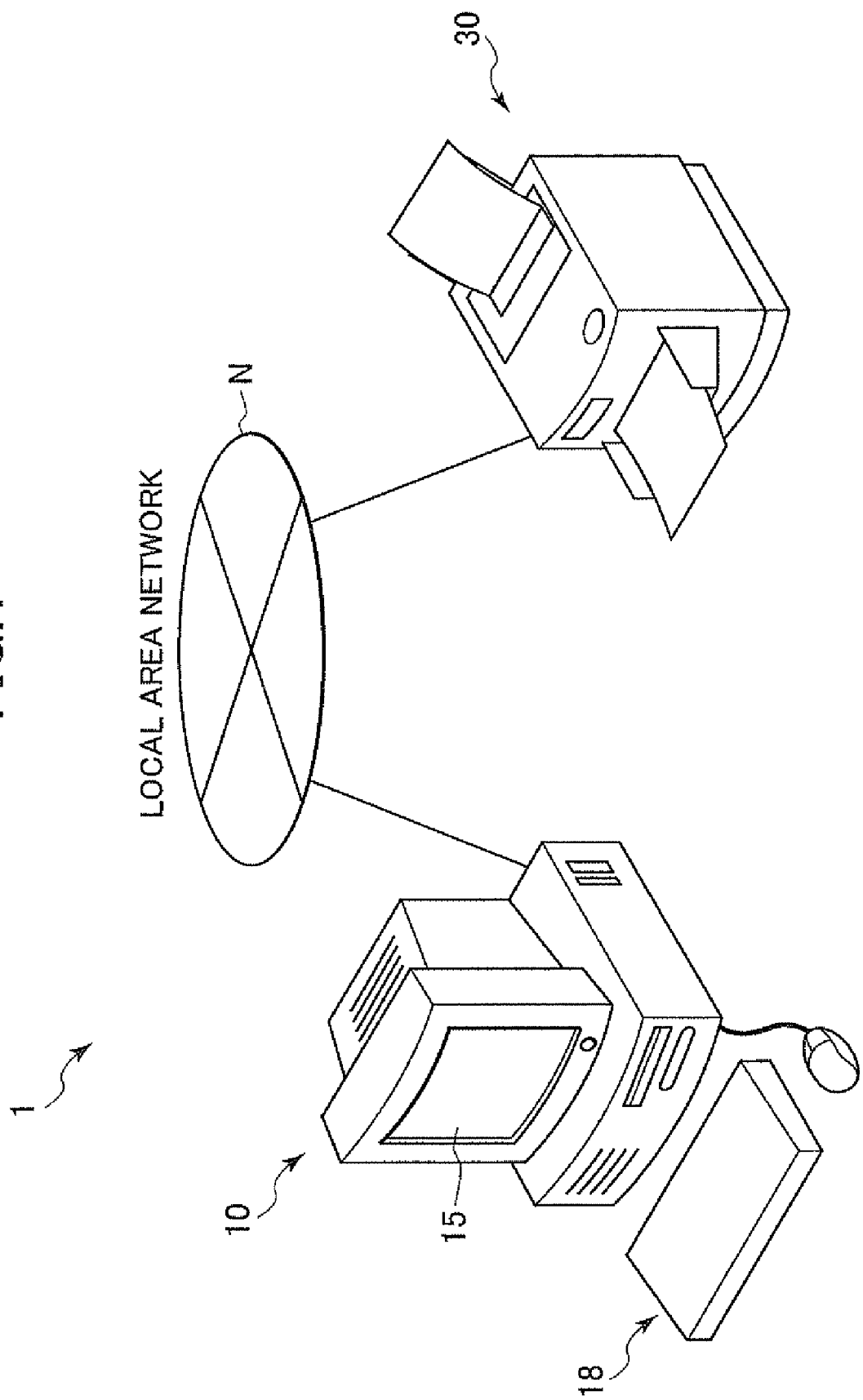
FIG. 1 is an explanatory diagram showing the configuration of a printing system according to a first embodiment.

As shown in FIG. 1, the printing system 1 according to the first embodiment includes a personal computer 10 and a printer 30. The personal computer 10 and printer 30 are connected to each other via a local area network (LAN) N. Hence, the personal computer 10 and printer 30 can transmit data to and receive data from each other in this printing system 1.

The printing system 1 according to the first embodiment is not limited to the configuration shown in FIG. 1, in which a single personal computer 10 is connected to a single printer 30 via the LAN N. For example, the printing system 1 may be configured of a plurality of personal computers 10 connected to a plurality of printers 30, or may be configured of the personal computer 10 and the printer 30 connected to each other via a USB cable.

Next, the structure of the personal computer 10 in the printing system 1 will be described in detail.

As shown in FIG. 1, the personal computer 10 includes a display unit 15, and an operating unit 18. The display unit 15 is configured of a CRT monitor, liquid crystal display, or the like and functions to display images based on various data. The operating unit 18 is configured of a keyboard or mouse, for example, and enables the user to input various operations.

Figure 2:
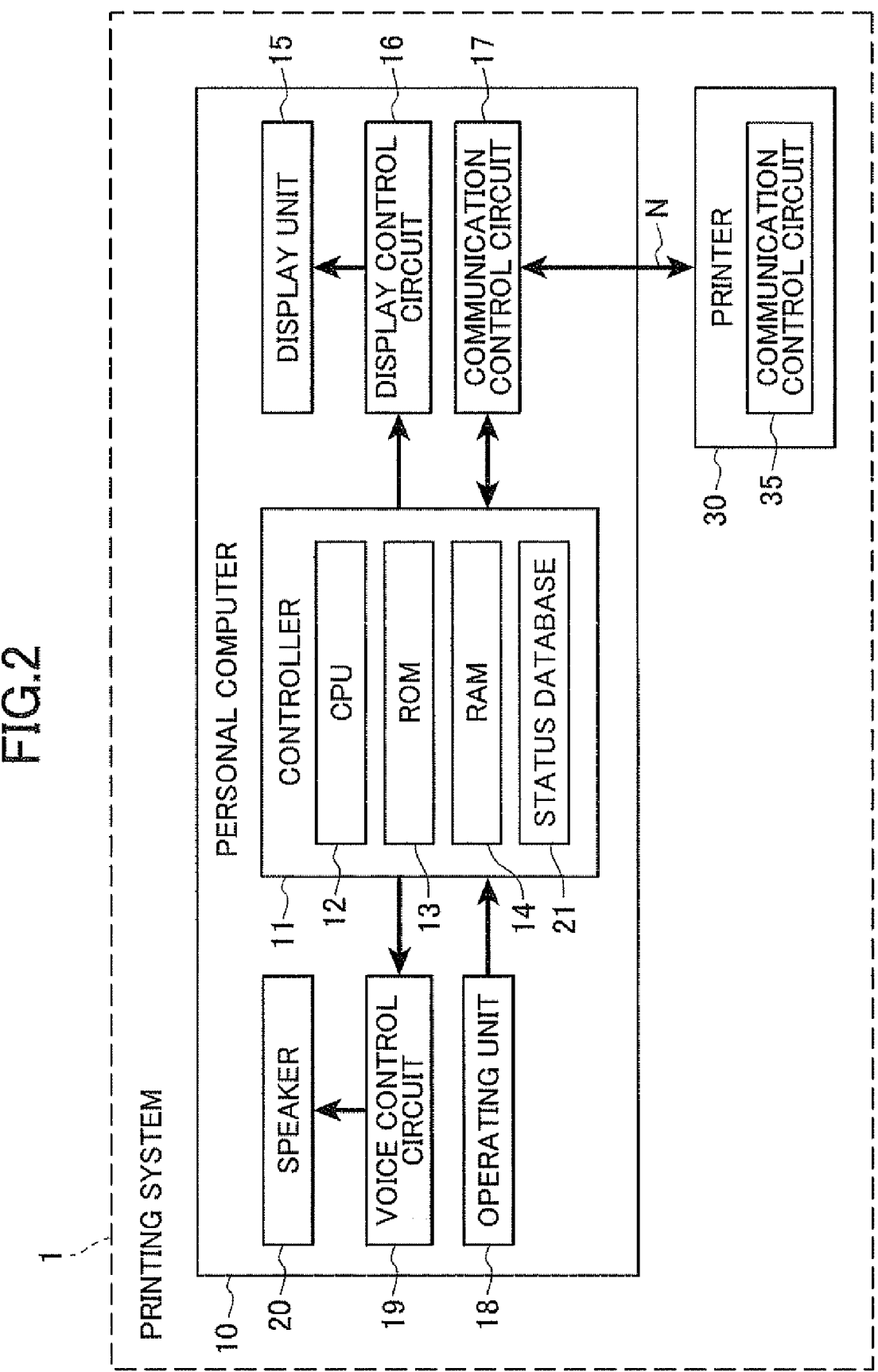
FIG. 2 is a block diagram showing primary configuration of a control system in a personal computer.

As shown in FIG. 2, the personal computer 10 includes a controller 11. The controller 11 performs central control for the personal computer 10 and includes a CPU 12, a ROM 13, a RAM 14, and a status database 21. The CPU 12 is a central processing unit that serves to control various peripheral devices according to data tables and control programs stored in the ROM 13 and RAM 14.

The ROM 13 is a non-rewritable memory that stores various control programs, and data tables. The ROM 13 also stores programs for a voicing process (see FIG. 6), an audio playback process (see FIG. 8), and a status reporting process (see FIG. 11) described later.

The RAM 14 is a rewritable memory for storing various data. The RAM 14 temporarily stores results of computations and the like performed when the CPU 12 executes control programs.

The status database 21 stores message text data associated with status codes described later. The message text data includes display status text, main voicing status text, and sub voicing status text. As shown in FIG. 12, the message text data is text for a message describing the status of the printer 30 as indicated by the status code. That is, the message text data is assigned with the status code. The display status text is used for displaying the condition of the printer 30 corresponding to the status code in a status window 80 described later. The main voicing status text is used for outputting the condition of the printer 30 corresponding to the status code as voice. The sub voicing status text is used in the same way as the main voicing status text to output the condition of the printer 30 corresponding to the status code as voice. However, as shown in FIG. 12, the sub voicing status text can indicate the condition of the printer with a different expression from the display status text and main voicing status text (see the example of status code "40021," for example). Further, the display status text, the main voicing status text, and the sub voicing status text may indicate the condition of the printer with a different expression from each other.

The controller 11 is also connected to a display control circuit 16, a communication control circuit 17, the operating unit 18, and a voice control circuit 19. The display control circuit 16 is used to control images displayed on the display unit 15 based on signals received from the controller 11. Therefore, the personal computer 10 can use the display control circuit 16 to display a window on the display unit 15 based on window data described later according to a control program, such as the operating system.

The communication control circuit 17 is used in control operations related to data communications with the printer 30 via the LAN N. Hence, the personal computer 10 can transmit print data, print execution signals, and other data and signals to the printer 30 via the communication control circuit 17. The personal computer 10 can also receive status data (FIG. 5) from the printer 30 via the communication control circuit 17. The status data will be described later in greater detail.

As described above, the operating unit 18 enables the user to input various operations. Since the operating unit 18 is connected to the controller 11, the controller 11 can receive operation signals from the operating unit 18. Hence, the personal computer 10 can implement control based on operation signals received in response to user operations.

The voice control circuit 19 includes a speech synthesis engine well known in the art. The speech synthesis engine is an internal driver for recognizing inputted text, for example, and outputting voice corresponding to the inputted text by synthesizing speech based on the recognition results. The voice control circuit 19 is connected to a speaker 20. Therefore, the personal computer 10 can control the form of voice outputted from the speaker 20 via the voice control circuit 19 based on a control program stored in the ROM 13. Specifically, the personal computer 10 can output text displayed in a window on the display unit 15 as voice based on the program for voicing process and audio playback process described later.

Next, the basic structure of the printer 30 in the printing system 1 according to the first embodiment will be described.

Figure 3:
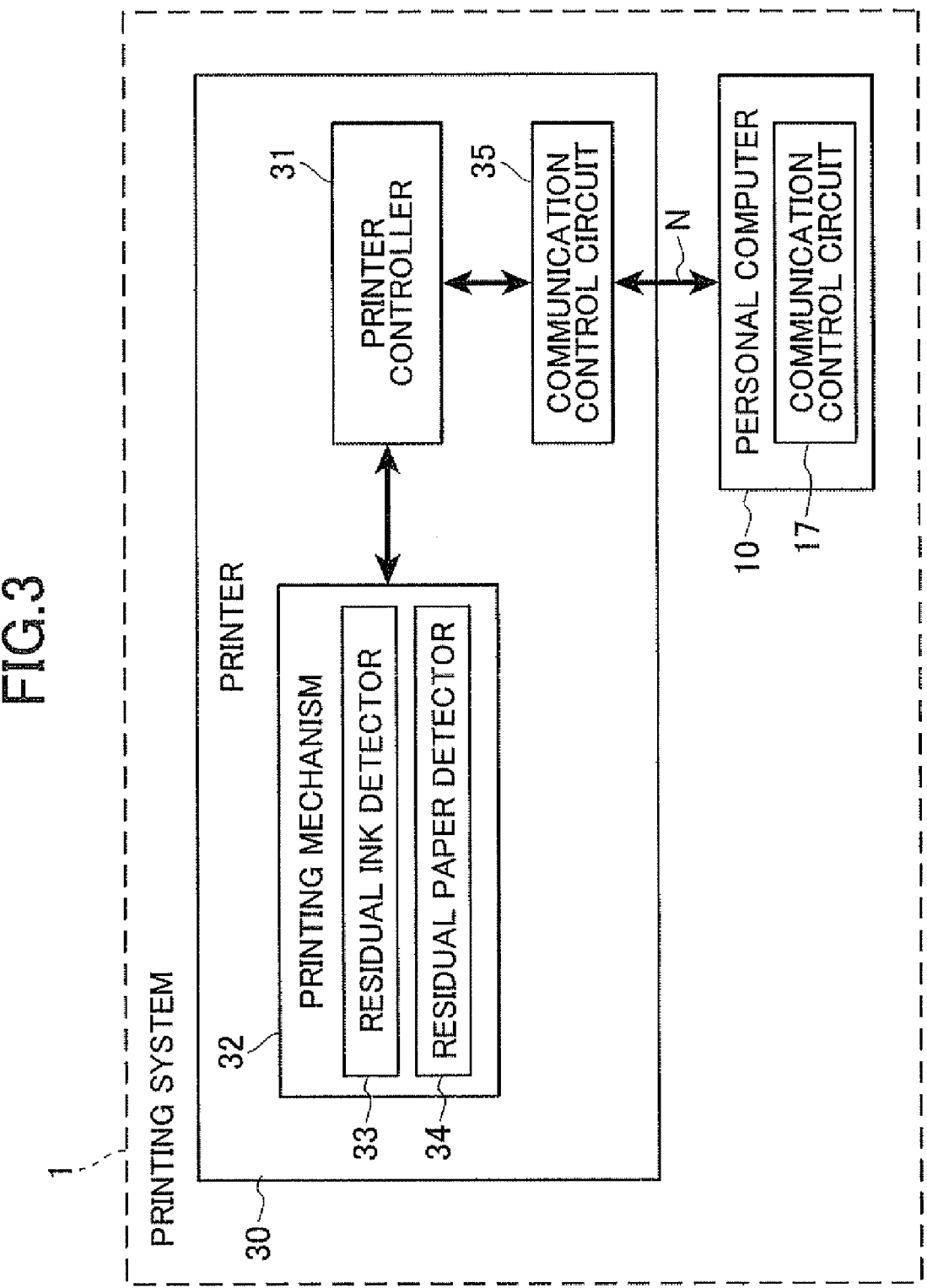
FIG. 3 is a block diagram showing a primary configuration of a control system for a printer.

As shown in FIG. 3, the printer 30 has a printer controller 31 that performs the core of control operations for the entire printer 30. While not shown in the drawings, the printer controller 31 is configured of a CPU, ROM, RAM, and the like. The CPU of the printer controller 31 performs various control processes, such as a process to record print data by executing a program for implementing a printer control process described later with reference to FIG. 4. The program for the printer control process is stored in the ROM of the printer controller 31. As will be described later, by executing the program for the printer control process, the printer controller 31 can transmit, to the personal computer 10 (the communication circuit 35), status data (see FIG. 5) indicating the status of the printer 30 ("Paper jam," for example).

The printer 30 also includes a printing mechanism 32 configured of a conveying mechanism (not shown) and a print head (not shown). The conveying mechanism functions to convey recording paper along a prescribed conveying path. The print head is an inkjet head and performs printing on recording paper based on print data by selectively ejecting ink supplied from ink cartridges. The basic structure of the print head and the conveying mechanism are well known in the art and will not be described here.

The printer 30 prints on a recording paper in four colors of ink: black, magenta, cyan, and yellow. Each of the four colors of ink is provided in a separate ink cartridge. Hence, the printing mechanism 32 has four ink cartridges for the four colors of ink. Each of the ink cartridges can be replaced.

The printing mechanism 32 also includes a residual ink detector 33. The residual ink detector 33 detects the quantity of residual ink in each ink cartridge. The residual ink detector 33 is connected to the printer controller 31. Hence, the printer controller 31 can acquire the quantity of residual ink for each color based on detection results in the residual ink detector 33. Since the method of detecting residual ink with the residual ink detector 33 is well known in the art, a detailed description of this method will not be given.

A paper cassette (not shown) is arranged in the printing mechanism 32. The paper cassette accommodates stacked sheets of recording paper of prescribed sizes (A3, A4, B4, and B5, for example). In a printing operation on the printer 30, the conveying mechanism conveys recording paper from the paper cassette.

The printing mechanism 32 also includes a residual paper detector 34. The residual paper detector 34 detects the quantity of residual recording paper in the paper cassette. The residual paper detector 34 is also connected to the printer controller 31. Hence, the printer controller 31 can acquire the quantity of residual recording paper in the paper cassette based on detection results in the residual paper detector 34. Since the method of detecting residual paper with the residual paper detector 34 is well known in the art, a detailed description of this method will not be provided.

The printer 30 also has a communication control circuit 35. The communication control circuit 35 is connected to the printer controller 31 and the personal computer 10. The communication control circuit 35 is used to control data transmission and reception between the printer 30 and the personal computer 10 via the LAN N. Specifically, the communication control circuit 35 is used to receive print data and various signals from the personal computer 10 and to transmit status data (see FIG. 5) and the like to the personal computer 10.

Figure 4:
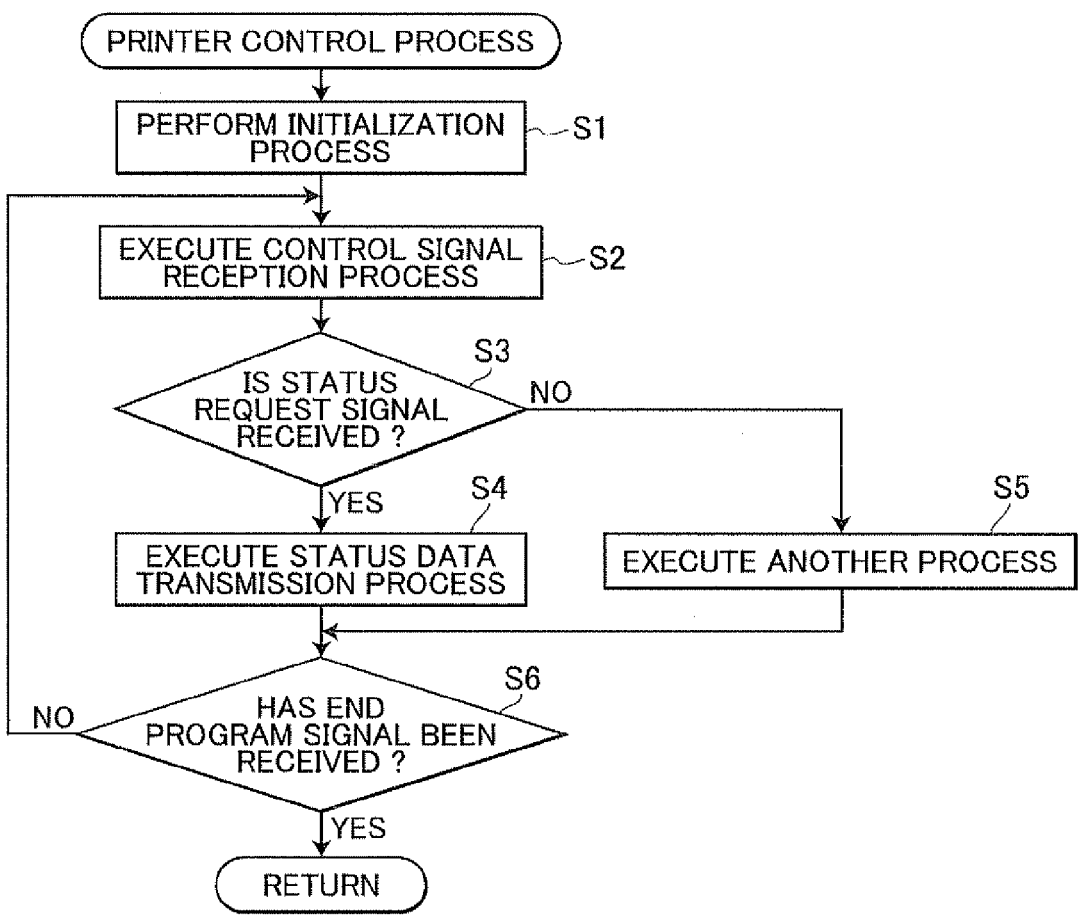
FIG. 4 is a flowchart illustrating steps in a printer control process.

Next, the program for the printer control process executed by the printer 30 of the first embodiment will be described. FIG. 4 is a flowchart illustrating steps in the printer control process. The program for the printer control process is a control program used to control the entire printer 30 of the printing system 1 and is executed by the printer controller 31.

The printer control process begins when power to the printer 30 is turned on. In S1, the printer controller 31 performs an initialization process. In the initialization process, the printer controller 31 initializes various storage areas (a print buffer), for example. After completion of the initialization process, the printer controller 31 proceeds to S2.

In S2 the printer controller 31 executes a control signal reception process. In this process, the printer controller 31 receives control signals, such as a print execution signal or a status request signal, from the personal computer 10. The print execution signal is a command to record print data that is transmitted from the personal computer 10 together with print data. The status request signal is a request for the printer 30 to transmit data indicating the status of the printer 30. The control signal reception process in S2 is executed until one of the control signals is received. Signals received in the control signal reception process also include control signals for the printer 30.

In S3 the printer controller 31 determines whether a status request signal is received in S2. Specifically, the printer controller 31 determines whether a status request signal transmitted from the personal computer 10 has been received via the communication control circuit 35. When a status request signal has been received (S3: YES), in S4 the printer controller 31 executes a status data transmission process. When a status request signal has not been received (S3: NO), in S5 the printer controller 31 executes another process.

In the status data transmission process of S4, the printer controller 31 generates status data indicating conditions of the printer 30 and transmits this status data to the personal computer 10 that issued the request. After transmitting the status data, the printer controller 31 advances to S6.

Here, the status data generated in S4 will be described.

Figure 5:
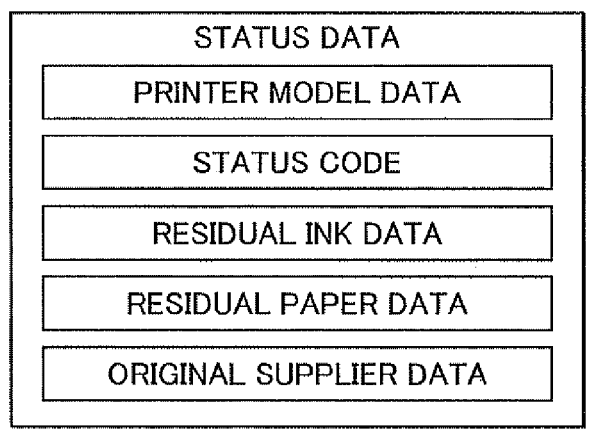
FIG. 5 is an explanatory diagram showing a content of status data.

As shown in FIG. 5, the status data according to the embodiment includes printer model data, status code, residual ink data, and residual paper data, and original supplier data. The printer model data indicates the manufacturer, and the model of the printer 30. An example of printer model data is "B Company printer, A Type." The printer model data is data unique to the printer 30 and stored in the ROM of the printer controller 31.

The status code is a five-digit numeric code indicating the status of the printer 30. For example, the status code "10001" may indicate that the printer is capable of printing ("Ready), an status code "10006" indicates that the printer is capable of printing but ink is low ("Out of ink, soon", for example). When the printer 30 is incapable of printing, the status code indicates the reason, such as "Paper jam" (see FIG. 12). The print controller 31 generates these status codes in S4 by confirming the condition of the printing mechanism 32 (conveying mechanism and the like). Since the status codes are well known in the art, a more detailed description of this data will not be given.

The residual ink data indicates the quantity of ink remaining in each of the four ink cartridges in the printer 30. Hence, the residual ink data indicates the amount of remaining ink in each of the four colors black, magenta, cyan, and yellow. The printer controller 31 generates this residual ink data based on detection results from the residual ink detector 33.

The residual paper data indicates the size and quantity of recording paper remaining in the paper cassette of the printer 30. The printer controller 31 generates this residual paper status data based on detection results from the residual paper detector 34 and the like. The printer controller 31 determines the recording paper size based on a setting for paper size in the paper cassette.

The original supplier data includes information on the original manufacturer of consumables (ink and recording paper) used in the printer 30, such as an address of the manufacturer's Web site. The original supplier data is referenced when displaying an original supplier link button 85 in the status window 80 described later.

As described above, the print controller 31 detects the status of the printing mechanism 32 and the like and generates status data based on the detection results in the status data transmission process of S4. The print controller 31 transmits this status data to the personal computer 10 that issued a status request signal. After transmitting the status data, the print controller 31 advances to S6.

In S5 the printer controller 31 executes a different process from the status data transmission process S4 corresponding to the control signal received in S2. For example, if the printer controller 31 has received a print execution signal in the control signal reception process of S2, in S5 the printer controller 31 performs a printing operation on recording paper based on print data. After completing the process in S5, the printer controller 31 advances to S6.

In S6 the printer controller 31 determines whether an end program signal has been received. If an end program signal has been received (S6: YES), the printer controller 31 executes a prescribed ending process to end the program for the printer control process. However, if an end program signal has not been received (S6: NO), the printer controller 31 returns to S2. In this case, the printer controller 31 waits for a new control signal to be received and executes the process in S3-S6 based on the newly received control signal.

Figure 6:
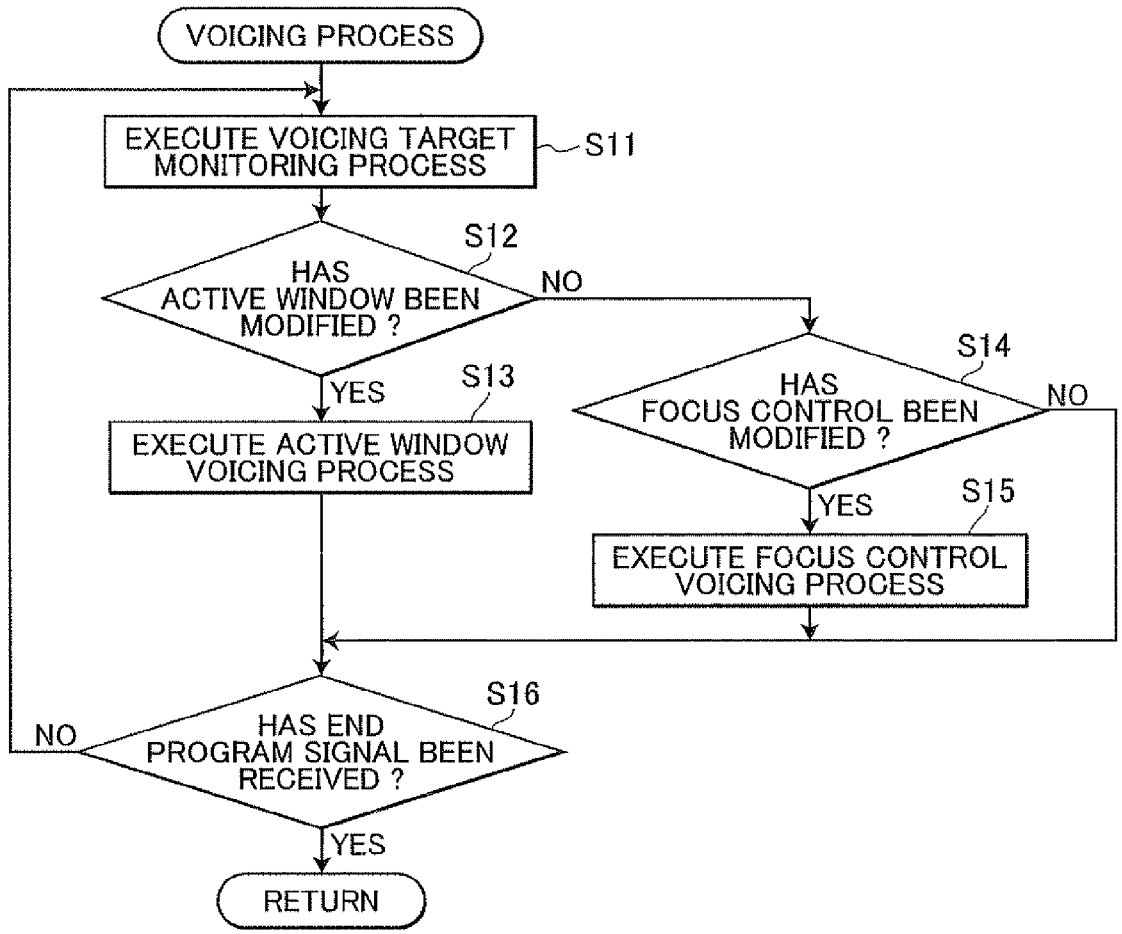
FIG. 6 is a flowchart illustrating steps in a voicing process of the first embodiment.

Next, the program for the voicing process executed by the personal computer 10 will be described. FIG. 6 is a flowchart illustrating steps in the voicing process of the first embodiment. The following description assumes that the power to the personal computer 10 is turned on and the personal computer 10 is under control of an operating system.

The program for the voicing process is executed in response to an operation that the user performs on the operating unit 18. At the beginning of the voicing process, in S11, the CPU 12 executes a voicing target monitoring process to monitor changes in windows and controls targeted for voicing.

Figure 7:
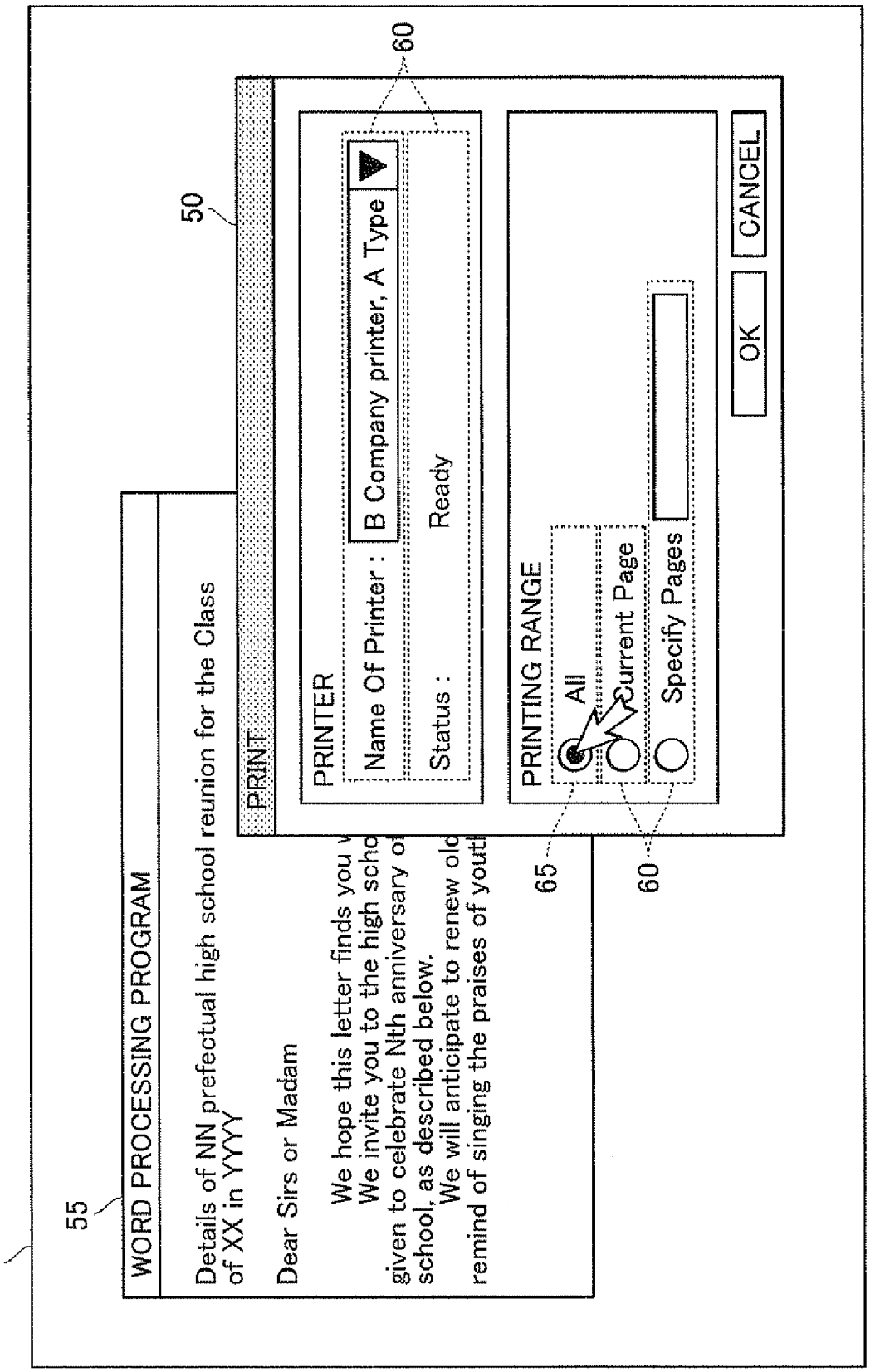
FIG. 7 is an explanatory diagram showing a sample screen display on a display unit of the personal computer.

Windows and controls targeted for voicing will be described next in greater detail. FIG. 7 is an explanatory diagram showing a sample screen display on the display unit 15 of the personal computer 10.

The operating system employing a window system is installed on the personal computer 10. The operating system includes a window manager, which is a program for managing the window system. Specifically, by executing the window manager, the personal computer 10 can modify the behavior, the size, and the design of windows displayed on the display unit 15, for example. A window is a rectangular display region on the display unit 15 assigned to an application program and the like. The RAM 12 stores window data corresponding to the window. The window data includes data concerning the corresponding window. Content is displayed in each window based on corresponding window data. For example, the content in a window shown in FIG. 7 for a word processing program is configured of test data ("Details of NN prefectual high school reunion for the Class of XX in YYYY," in this example) included in the window data. In this way, the personal computer 10 can display a plurality of windows on the display unit 15 based on user operations, as shown in FIG. 7.

In the example of FIG. 7, the display unit 15 displays an active window 50 and an inactive window 55. The active window 50 is the window currently in use when a plurality of windows is open. In the example of FIG. 7, the Print window corresponds to the active window 50. A mouse pointer or a cursor are ordinarily displayed in the active window 50, enabling the user to input instructions. The inactive window 55 is a window not currently operating in the window system. In the example of FIG. 7, a window for a word processing program corresponds to the inactive window 55. The window manager changes the active window 50 and inactive window 55 based on user operations on the operating unit 18.

Each window is configured of including controls 60. The control 60 is a graphical user interface (GUI) element often called a widget, such as a button (e.g., a radio button), a text box, and a drop-down list. The Print window shown in FIG. 7 has a plurality of controls 60, including radio buttons for selecting a printing range.

In the embodiment, the currently selected control 60 is referred to as a focus control 65. The focus control 65 is acceptable a user input operation. The operating system changes which control 60 is the focus control 65 based on user operations on the operating unit 18.

Hence, in the voicing target monitoring process of S11, the CPU 12 monitors changes in the active window 50 and changes in the focus control 65 based on operation signals inputted via the operating unit 18. The CPU 12 ends the voicing target monitoring process and advances to S12 upon detecting a user operation for the window or the control 60 based on operation signals inputted via the operating unit 18.

In S12 the CPU 12 determines whether the active window 50 has been modified by a user operation. Specifically, the CPU 12 determines whether the user has performed an operation to start an application program or to select a different window based on the operation signal from the operating unit 18. The CPU 12 advances to S13 if the active window 50 has been changed (S12: YES). The CPU 12 advances to S14 if the active window 50 has not been changed (S12: NO).

In S13 the CPU 12 executes an active window voicing process. In the active window voicing process, the CPU 12 acquires all text data included in the window data for the active window 50. The CPU 12 then outputs a symbolic linguistic representation including phonetics symbols and prosodic data based on the acquired text data. Subsequently, the CPU 12 outputs voice data for the text data based on the symbolic linguistic representation. The voices that read text in the text data are outputted from the speaker 20. After reading all text in the text data of the window data for the active window 50, the CPU 12 ends the active window voicing process and advances to S16.

Here, the CPU 12 stores a voicing flag in the RAM 14 when beginning an active window voicing process of S14 to voice all text data in the active window 50 (text data in the window data corresponding to the active window 50). The CPU 12 erases the voicing flag from the RAM 14 upon completing the voicing of all text data in the active window 50 (text data in the window data corresponding to the active window 50). In other words, the voicing flag indicates whether voice is currently being outputted based on the program for the voicing process.

When advancing to S14 based on the determination results in S12, the CPU 12 determines whether the focus control 65 has been modified. Specifically, the CPU 12 determines whether a different control 60 has been selected as the focus control 65 based on the operation signal inputted via the operating unit 18. The CPU 12 advances to S15 if the focus control 65 has been modified (S12: YES). The CPU 12 advances to S16 if the focus control 65 has not been modified (S12: NO).

In S15 the CPU 12 executes a focus control voicing process. In the focus control voicing process, the CPU 12 identifies the window data in which the focus control 65 belongs. The window data includes text data corresponding to each control. The CPU 12 acquires text data corresponding to the focus control 65 included in the window data and subsequently converts the acquired text data for the focus control 65 to a symbolic linguistic representation and outputs the text data as voice data. In the example of FIG. 7, since the user selects "All", the CPU 12 outputs the word "All" for the printing range as voice data. After reading text data for the focus control 65, the CPU 12 ends the focus control voicing process and advances to S16.

Here, the CPU 12 stores the voicing flag in the RAM 14 when beginning the focus control voicing process in S15 to voice text data associated with the focus control 65. The CPU 12 erases the voicing flag from the RAM 14 upon completing the voicing of text data associated with the focus control 65. In other words, the voicing flag indicates whether voice is currently being outputted based on the program for the voicing process.

In S16 the CPU 12 determines whether an end program signal has been received. If an end program signal has been received (S16: YES), the CPU 12 executes a prescribed ending process to end the voicing process of FIG. 6. However, if an end program signal has not been received (S16: NO), the CPU 12 returns to S11 and repeats the voicing target monitoring process described above.

Accordingly, the CPU 12 of the personal computer 10 voices content in the active window 50 and the focus control 65 according to user operations and the like until the voicing process ends.

Figure 8:
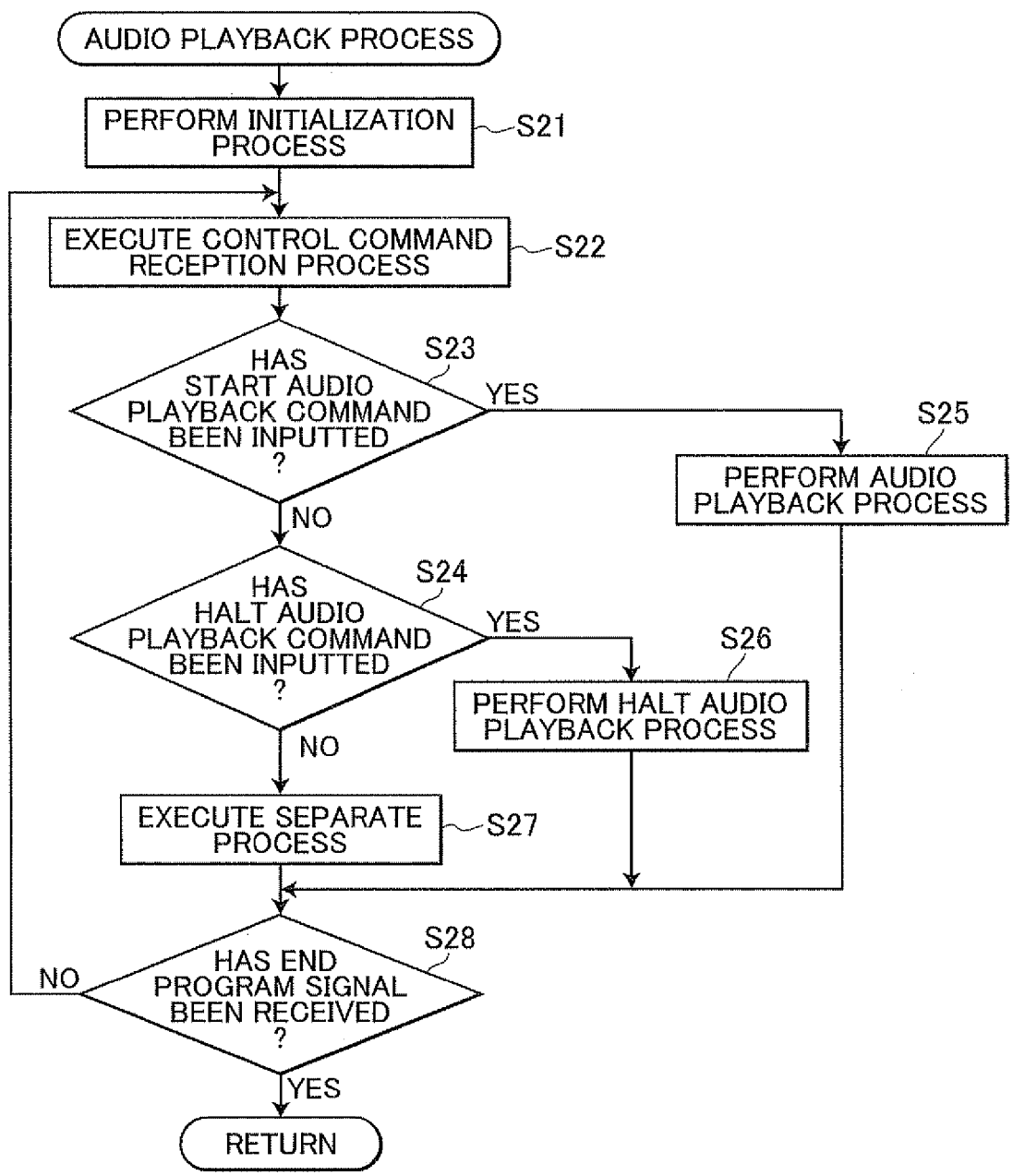
FIG. 8 is a flowchart illustrating steps in an audio playback process implemented by a program according to the first embodiment.

Next, an audio playback process executed on the personal computer 10 will be described. FIG. 8 is a flowchart illustrating steps in the audio playback process implemented by a program according to the first embodiment. Here, the audio playback process is process for voicing text that is different from the voicing process. The audio playback process is configured of being executed concurrently with the voicing process.

In S21 at the beginning of the audio playback process, the CPU 12 performs an initialization process. In the initialization process, the CPU 12 initializes the voice control circuit 19, speaker 20, and the like.

Figure 14:
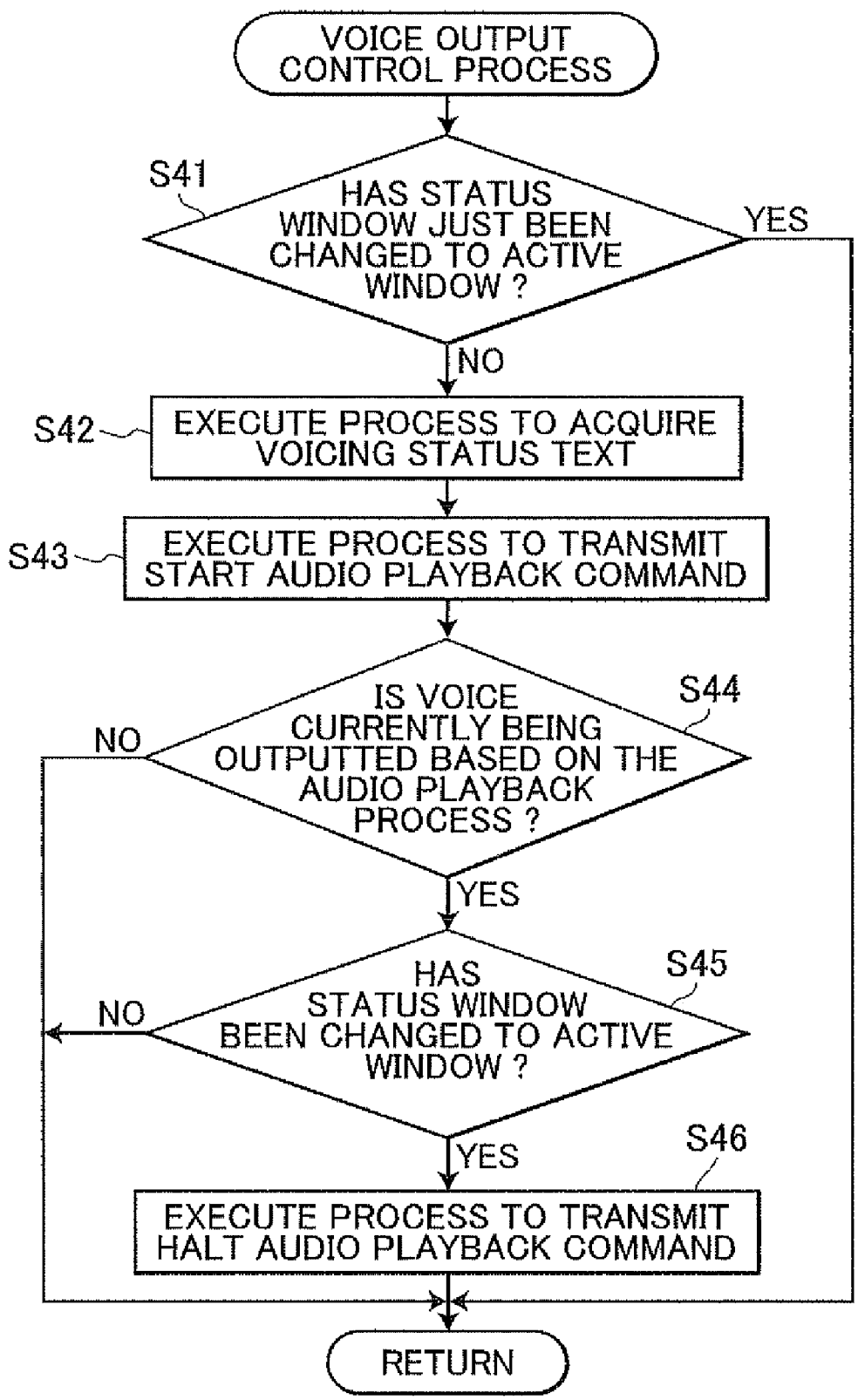
FIG. 14 is a flowchart illustrating steps in a voice output control process according to the first embodiment.

In S22 the CPU 12 executes a control command reception process. In this process, the CPU 12 receives control commands for the voice control circuit 19. The control command reception process of S22 is executed until the CPU 12 detects input of a control command for the voice control circuit 19. For example, as described later, a start audio playback command or a halt audio playback command is inputted into the voice control circuit 19 as a control command. Here, the start audio playback command is inputted into the voice control circuit 19 in a start audio playback command transmission process (S43) of the voice output control process (FIG. 14). The halt audio playback command is inputted into the voice control circuit 19 in a halt audio playback command transmission process (S46) of the voice output control process. When a control command is inputted for the voice control circuit 19, the CPU 12 ends the control command reception process and advances to S23.

In S23 the CPU 12 determines whether a start audio playback command has been inputted into the voice control circuit 19 in S22. The start audio playback command is a control command to begin voice output based on text data targeted for voicing by the speech synthesis engine. This start audio playback command is inputted into the voice control circuit 19 together with the text data (main voicing status text data, for example) in the start audio playback command transmission process (S43). The CPU 12 advances to the audio playback process in S25 when a start audio playback command has been inputted (S23: YES). The CPU 12 advances to S24 when a start audio playback command has not been inputted (S23: NO).

In S24 the CPU 12 determines whether a halt audio playback command has been inputted into the voice control circuit 19 in S22. The halt audio playback command is a control command for halting voice output based on text data executed in response to the start audio playback command. The CPU 12 advances to a halt audio playback process in S26 when a halt audio playback command has been inputted (S24: YES). The CPU 12 advances to S27 when a halt audio playback command has not been inputted (S24: NO).

When advancing to the audio playback process of S25, the CPU 12 inputs the text data (the main voicing status text data, for example) received together with the start audio playback command into the speech synthesis engine and outputs voice from the speaker 20 based on the text data. When voice output begins based on the text data, the CPU 12 advances to S28. Hence, if the main voicing status text data is inputted, the printing system 1 outputs voice based on the main voicing status text data according to the audio playback process. Through audio rendering based on the main voicing status text data, the printing system 1 can report the condition of the printer 30 to the user.

In the halt audio playback process of S26, the CPU 12 halts the current execution of voice output according to the program for the audio playback process. For example, if the process in S26 is executed while voice is being outputted based on the main voicing status text data, the printing system 1 halts this voice output whether or not the output is completed. After halting the voice output, the CPU 12 advances to S28. That is, the CPU 12 halts the voice output that is started in the audio playback process (S25).

In S27 the CPU 12 executes a separate process. Specifically, the CPU 12 executes a process in S27 corresponding to the control command inputted in S22, excluding a start audio playback command and a halt audio playback command. For example, if the personal computer 10 possesses a plurality of speech synthesis engines, the CPU 12 may execute a process in S27 to select one of the speech synthesis engines based on the inputted control command. After completing the separate process in S27, the CPU 12 advances to S28.

In S28 the CPU 12 determines whether an end program signal has been received. If an end program signal has been received (S28: YES), the CPU 12 executes a prescribed ending process to end the program for the audio playback process. However, if an end program signal has not been received (S28: NO), the CPU 12 returns to S22. Hence, the personal computer 10 outputs voice based on text data, such as the main voicing status text, in response to control commands until the program for the audio playback process ends.

Figure 9:
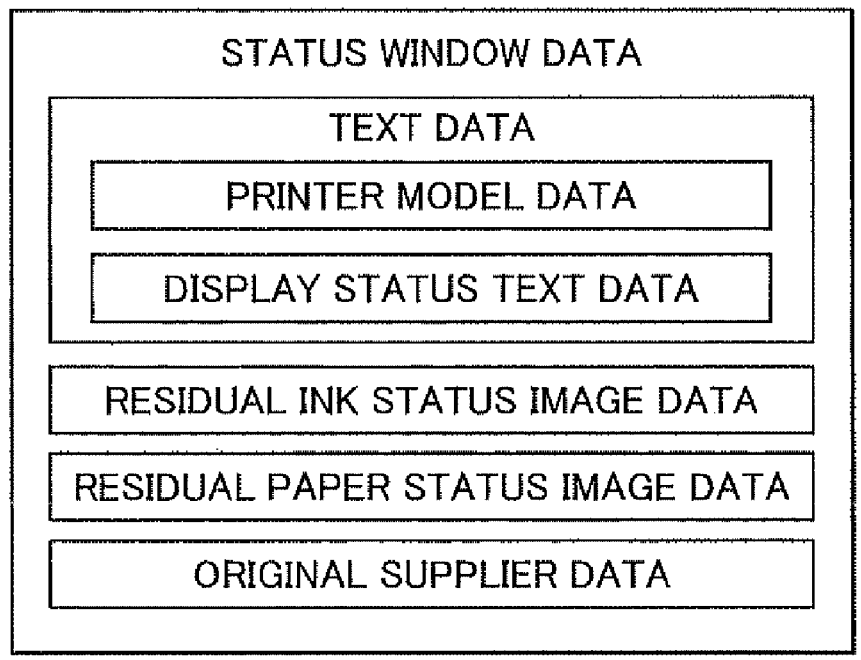
FIG. 9 is an explanatory diagram showing status window data related to status window.
Figure 10:
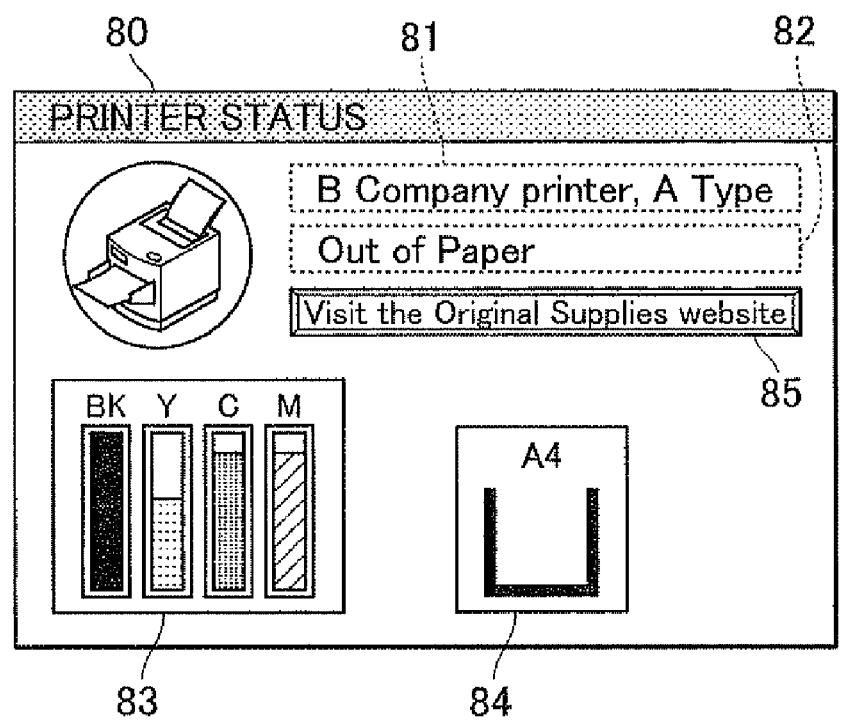
FIG. 10 is an explanatory diagram showing a sample display of the status window.

Next, a status window 80 displayed on the display unit 15 of the personal computer 10 will be described in detail. FIG. 9 is an explanatory diagram showing status window data related to the status window 80. FIG. 10 is an explanatory diagram showing a sample display of the status window 80.

In the present embodiment, the window data corresponding to the status window 80 is referred as status window data. In other words, the status window data is one of examples of the window data corresponding to the status window 80. As shown in FIG. 9, the status window data includes printer model data (text data), display status text data, residual ink status image data, residual paper status image data, and original supplier data.

The status window 80 is displayed as a single window on the display unit 15 based on the status window data (see FIG. 9). As shown in FIG. 10, the status window 80 displays printer model name text 81, status text 82, a residual ink graph 83, a residual paper graph 84, and an original supplier link button 85. The status window data is generated based on status data acquired from the printer 30 of the printing system 1.

The printer model name text 81 is text for the model name of the printer 30 and the like (for example, the manufacturer and model name). As shown in FIG. 5, the printer model data is part of the status data transmitted from the printer 30 in S4. When the personal computer 10 acquires this status data, the CPU 12 adds the printer model data to the status window data as text (see FIG. 9). The printer model name text 81 is displayed based on the printer model data added to the status window data (see FIG. 10). For example, if the status data is transmitted from an A-type printer 30 manufactured by B Company, the status window 80 displays text "B Company printer, A Type" as the printer model name text 81.

Figure 13:
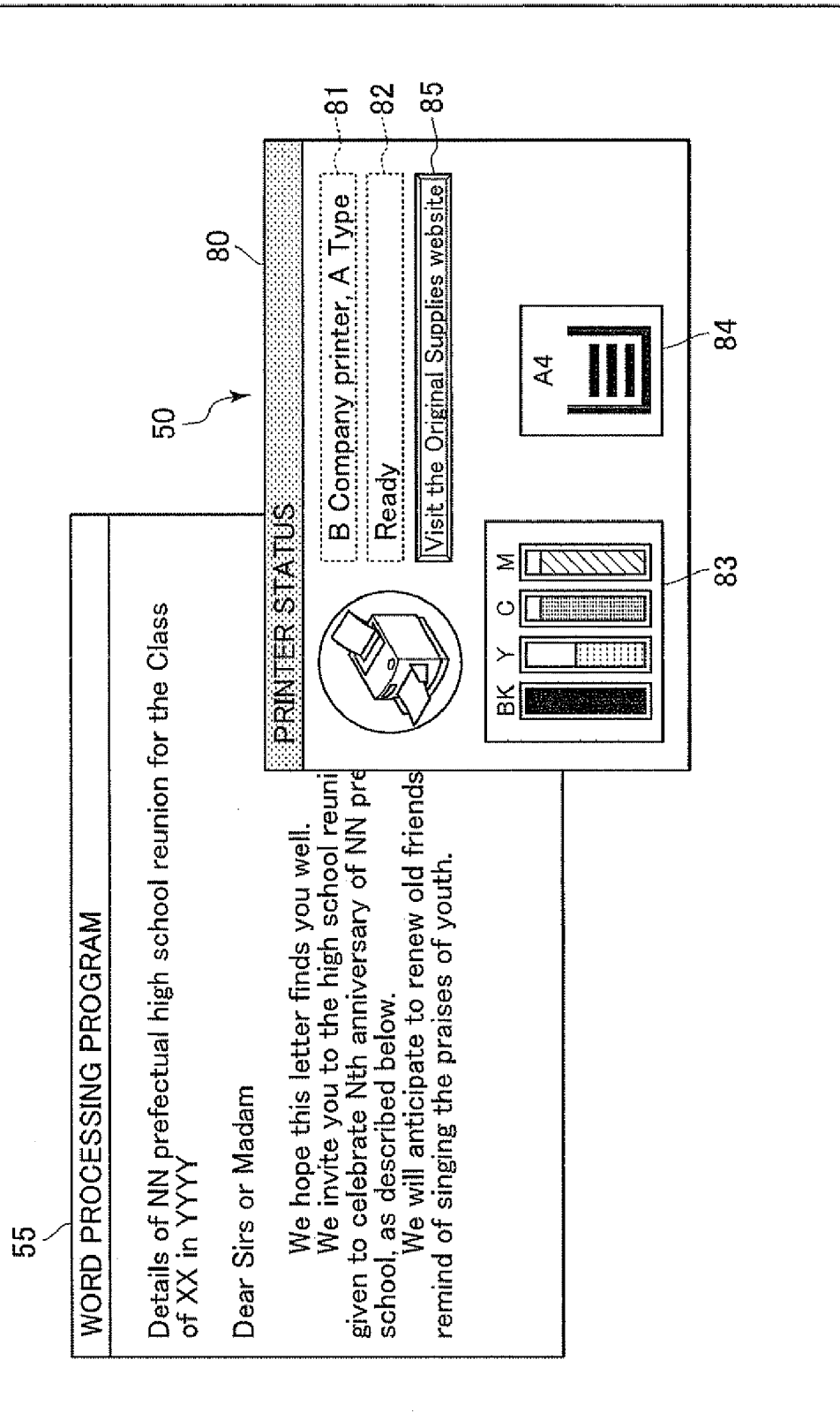
FIG. 13 is an explanatory diagram showing a status window on a display unit of the personal computer.

The status text 82 is text data indicating the status of the printer 30. As shown in FIG. 5, the status data includes a status code. When the personal computer 10 acquires this status data from the printer 30, the CPU 12 obtains display status data corresponding to the status code by referring the status database 21 and adds the obtained display status text data corresponding to the status code to the status window data (S35), as shown in FIG. 9. The status text 82 is displayed based on the display status text data included in the status window data as text data. For example, if the printer 30 transmits status data (the status code "10001") when in a state capable of printing, the text data "Ready" is displayed in the status window 80 as the status text 82 (FIG. 13).

The residual ink graph 83 is image data showing the quantity of remaining ink in each ink cartridge provided in the printer 30. Specifically, the residual ink graph 83 is configured of a bar graph indicating the remaining quantities of ink for each of the four colors. As shown in FIG. 5, the status data transmitted from the printer 30 also includes residual ink data. When the personal computer 10 acquires this status data, the CPU 12 adds residual ink status image data based on the residual ink data to the status window data (see FIG. 9). The residual ink graph 83 is displayed based on the residual ink status image data (see FIG. 10). The residual ink graph 83 is created based on a graphical pattern and the quantities of remaining ink indicated in the residual ink data. The graphical pattern for residual ink is stored in the program for the status reporting process or in the ROM 13, for example. The residual ink graph 83 created as described above is displayed in the status window 80.

The residual paper graph 84 is image data representing the quantity of recording paper remaining in the paper cassette of the printer 30. The quantity of residual recording paper in the paper cassette is expressed as lines in a graphical image indicating the level of residual paper (see FIG. 13). As shown in FIG. 5, the status data transmitted from the printer 30 also includes residual paper data. When the personal computer 10 acquires this status data, the CPU 12 adds residual paper status image data based on the residual paper data to the status window data (see FIG. 9). The residual paper graph 84 is displayed based on the residual paper status image data (see FIG. 10). The residual paper graph 84 is created based on a graphical pattern and the quantity of remaining paper indicated in the residual paper data. The graphical pattern for residual paper is stored in the program for the status reporting process or in the ROM 13. The residual paper graph 84 created as described above is displayed in the status window 80.

The original supplier link button 85 is provided with an embedded hyperlink to the Internet Web site of the manufacturer providing original consumables for the printer 30, such as ink cartridges and recording paper. When the user performs an operation on the original supplier link button 85, the personal computer 10 launches an Internet browser to display the manufacturers Web site. As shown in FIG. 5, the status data transmitted from the printer 30 includes original supplier data. When the personal computer 10 acquires status data, the CPU 12 adds the original supplier data to the status window data (see FIG. 9). The original supplier link button 85 is displayed based on the original supplier data in the status window data (see FIG. 10).

Figure 11:
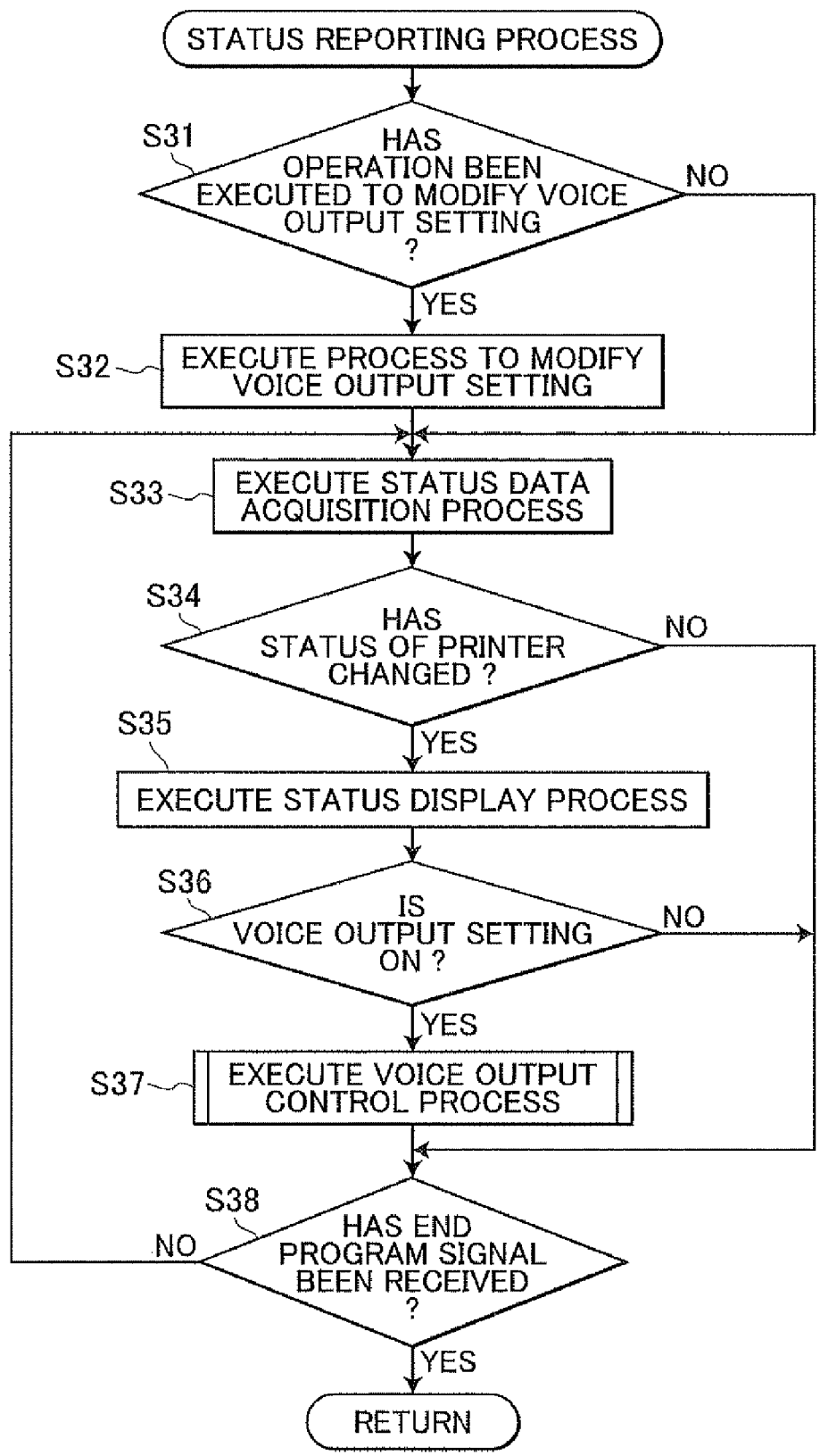
FIG. 11 is a flowchart illustrating steps in a status reporting process.

Next, a program executed by the personal computer 10 to implement a status reporting process will be described in detail. FIG. 11 is a flowchart illustrating steps in the status reporting process. In the following description, it will be assumed that the status window 80 described above has been displayed on the display unit 15. The status window 80 according to the embodiment is displayed in response to a user operation instructing that the window be displayed or when an error such as a paper jam occurs in the printer 30. The status reporting process is configured of being executed concurrently with the voicing process (FIG. 6) and the audio playback process (FIG. 8).

In S31 at the beginning of the status reporting process, the CPU 12 determines whether an operation has been executed to modify a voice output setting. For example, in this operation the display unit 15 displays a window for setting the voice output setting. Thus, based on the window the user can modify the voice output setting by using the operating unit 18. The CPU 12 determines whether the user has performed an operation to modify the voice output setting based on an operation signal from the operating unit 18. The CPU 12 advances to S32 if an operation to change the setting has been made (S31: YES). The CPU 12 advances to S33 if an operation has not been performed (S31: NO).

In S32 the CPU 12 executes a process to modify the voice output setting. In this process, the CPU 12 receives a user setting indicating whether or not to output voice based on the program for the audio playback process (see FIG. 8). In other words, the user can selectively set the voice output setting to on or off. The CPU 12 stores data indicating the selected on or off setting in the RAM 14 based on the user operation. Subsequently, the CPU 12 ends the process to change the voice output setting and advances to S33.

In S33 the CPU 12 executes a status data acquisition process. In this process, the CPU 12 first transmits a status request signal to the printer 30. As described above, upon receiving a status request signal, in S4 the printer 30 transmits status data (see FIG. 5) indicating the current status of the printer 30 to the personal computer 10. The CPU 12 stores the status data received from the printer 30 in the RAM 14 and subsequently ends the status data acquisition process in S33 and advances to S34.

In S34 the CPU 12 determines whether the status of the printer 30 has changed. Specifically, the CPU 12 executes a determination process by referencing status data stored in the RAM 14. Here, if new status data is acquired and stored in the RAM 14, it is possible to wait to delete the previously received status data from the RAM 14 until determining that the status has changed. The CPU 12 advances to S35 when the status of the printer 30 has changed (S34: YES). The CPU 12 advances to S38 when the status of the printer 30 has not changed (S34: NO).

In S35 the CPU 12 executes a status display process. In this process, the CPU 12 first references the status data acquired in S33 and stored in the RAM 14. Next, the CPU 12 updates the content of the status window data to content based on the newly acquired status data. For example, when the residual ink data and the residual paper data has changed, the CPU 12 updates the residual ink status image data and the residual paper status image data based on the latest residual ink data and residual paper data, respectively. If the status code in the newly acquired status data has changed from the status code in the previously acquired status data, the CPU 12 references the status database 21 and updates the display status text data to data corresponding to the latest status code (the status code in the newly acquired status data) (see FIG. 12). Subsequently, the CPU 12 displays the status window 80 on the display unit 15 based on the updated status window data (see FIG. 13). As a result, the updated state of the printer 30 is displayed in the status window 80. After completing the status display process of S35, the CPU 12 advances to S36. The positions for displaying various data in the status window data within the status window 80 are defined in the program for the status reporting process. Even though the display of the status window 80 is updated in the process of S35, the status window 80 may be set as the inactive window 55 when the user has launched a separate program to display on the display unit 15 and perform operations in the window of this program. In other words, the status window 80 is not necessarily set as the active window 50 after the process of S35 is performed.

In S36 the CPU 12 determines whether the voice output setting is on by referencing the RAM 14. The CPU 12 advances to a voice output control process in S37 if the voice output setting is on (S36: YES). The CPU 12 advances to S38 if the voice output setting is off (S36: NO). In the latter case, the printing system 1 does not report the status of the printer 30 by voice based on the program for the audio playback process.

In S37 the CPU 12 executes the voice output control process. This process is performed based on a program for the voice output control process described later. Specifically, the CPU 12 controls voice output according to the program for the audio playback process (see FIG. 8) based on conditions for voice output set in the personal computer 10. The program for the voice output control process will be described later in detail, and a detailed description of this process will not be given here. After completing the voice output control process in S37, the CPU 12 advances to S38.

In S38 the CPU 12 determines whether an end program signal has been received. If an end program signal has been received (S38: YES), the CPU 12 executes a prescribed ending process to end the program for the status reporting process. However, if an end program signal has not been received (S38: NO), the CPU 12 returns to S33 and again acquires status data from the printer 30. Subsequently, in S35-S37 the personal computer 10 updates the display in the status window 80 and outputs voice when there are any changes in the status of the printer 30. Through the display in the status window 80 and the outputted voice, the user can stay informed of the latest status of the printer 30.

Next, the voice output control process performed in S37 will be described in detail. FIG. 14 is a flowchart illustrating steps in the voice output control process. In S41 at the beginning of this process, the CPU 12 determines whether the status window 80 has just been changed to the active window 50.

As described above in the voicing process of FIG. 6, when the CPU 12 determines that the active window 50 has changed (S12: YES), the CPU 12 voices text data included in the window data associated with the new active window 50. Hence, the CPU 12 determines that the status window 80 has just been changed to the active window 50 immediately after voicing of text data included in the status window data has begun in the voicing process. Specifically, in S41 the CPU 12 determines whether both of two following conditions are satisfied or not. A first condition is that a prescribed time is not passed from a time when the active window voicing process (S13) has performed or when the focus control voicing process (S15) has performed. A second condition is that the active window 50 is not changed. If both of two conditions are satisfied, the CPU 12 determines that the status window 80 has just been changed to the active window 50. If at least one of the two conditions is not satisfied, the CPU 12 determines that the status window 80 has not just been changed to the active window 50.

Therefore, in S41 the CPU 12 determines whether voice output based on the status window data has just begun in the voicing process. If the status window 80 has just been changed to the active window 50 (S41: YES), the CPU 12 ends the current voice output control process. However, if the status window 80 has not just been changed to the active window 50 (S41: NO), the CPU 12 advances to S42.

If the status window 80 has just been changed to the active window 50 (S41: YES), content of the status window 80 is not converted to voice through the program for the audio playback process (see FIG. 8). However, content of the status window 80 is voiced according to the program for the voicing process (see FIG. 6). Therefore, the user can learn the state of the printer 30 through voice outputted according to the voicing process. On the other hand, when the status window 80 has not been changed to the active window 50, voice output according to the program for the voicing process is not performed, even if the contents of the status window 80 have changed.

In S42 the CPU 12 executes a process to acquire voicing status text. In this process, the CPU 12 first references the status code stored in the RAM 14. Next, the CPU 12 acquires voicing status text data (the main voicing status text, for example) associated with the status code from the status database 21. After storing the acquired voicing status text data in the RAM 14, the CPU 12 ends the process to acquire voicing status text and advances to S43.

For example, if the status code "41000" is stored in the RAM 14, the CPU 12 acquires the main voicing status text data from the status database 21 including the character string "Out of paper. Please load more paper." At this time, the CPU 12 may be configured to acquire the sub voicing status text data "Please load more paper."

In S43 the CPU 12 executes the process to transmit a start audio playback command. Specifically, the CPU 12 inputs the acquired voicing status text data and a start audio playback command into the voice control circuit 19. After inputting the acquired voicing status text data and the start audio playback command into the voice control circuit 19, the CPU 12 ends the process to transmit the start audio playback command and advances to S44.

When voicing status text data and a start audio playback command are inputted into the voice control circuit 19 in S43, in S25 the CPU 12 begins outputting voice in the printing system 1 based on the voicing status text data. In other words, the voice control circuit 19 outputs voice indicating the status of the printer 30 displayed in the status window 80. Accordingly, the user can learn the status of the printer 30 through voice outputted according to the audio playback process.

In S44 the CPU 12 determines whether voice is currently being outputted based on the audio playback process. If voice is currently being outputted (S44: YES), the CPU 12 advances to S45. However, if voice is not currently being outputted according to the audio playback process (S44: NO), the CPU 12 ends the voice output control process. The negative determination (S44: NO) in this case indicates that voice output based on the audio playback process has completed.

In S45 the CPU 12 determines whether the status window 80 has been changed to the active window 50. In other words, the CPU 12 determines whether the status window 80 has been switched to the active window 50 while voice output is currently being executed based on the audio playback process (S44: YES). If the status window 80 has been changed to the active window 50 (S45: YES), the CPU 12 advances to S46. However, if the status window 80 has not been changed to the active window 50 (S45: NO), the CPU 12 ends the voice output control process.

In S46 the CPU 12 executes a process to transmit a halt audio playback command. In this process, the CPU 12 inputs a halt audio playback command into the voice control circuit 19 to halt voice output started in S43. After inputting a halt audio playback command into the voice control circuit 19, the CPU 12 ends the voice output control process.

Through the voicing process described above in FIG. 6, when the status window 80 is changed to the active window 50 (S12: YES), the CPU 12 voices text data included in window data related to the new active window 50. In other words, when the status window 80 has just been changed to the active window 50, the program for the voicing process has begun or is about to begin the voicing of text data included in the status window data. That is, the status window 80 has just been changed to the active window 50 from the inactive window 55 after executing S41 and before executing S44.

Therefore, the CPU 12 advances to S46 when voice output starts based on the voicing process while voice output is performed based on the voicing status text data according to the audio playback process. In this case, the printing system 1 inputs the halt audio playback command into the voice control circuit 19 to halt voice output based on the audio playback process. As a result, voice based on the voicing process is outputted from the speaker 20 without overlapping voice output according to the audio playback process. In other words, the printing system 1 can prevent overlapping of voice outputted according to the voicing process and according to the audio playback process that would be difficult for the user to understand. Therefore, the user can reliably learn the status of the printer 30 through voice based on the voicing process.

As described above, when status data is acquired from the printer 30 (S4, S33), the printing system 1 according to the first embodiment and the control program for a printing system acquire voicing status text data corresponding to a status code in the status data from the status database 21 (see FIG. 12; S42). By inputting this voicing status text data into the voice control circuit 19 (S43), the printing system 1 and the control program for a printing system can report the status of the printer 30 by voice (S25). Accordingly, the printing system 1 and the control program for a printing system can report accurate content associated with the state of the printer 30 to the user by voice based on the voicing status text data. As a result, the user can accurately learn the condition of the printer 30 through voice and can take appropriate measures based on this condition.

Further, when status data is acquired, the printing system 1 and the control program for a printing system generate status window data based on this status data. Next, the printing system 1 and the control program for a printing system display the status window 80 on the display unit 15 based on the status window data. At this time, the status text 82 is displayed in the status window 80 based on the display status text data corresponding to the status code. Hence, the printing system 1 and the control program for a printing system can report the condition of the printer 30 to the user through voice based on the voicing status text data and through a display based on the display status text data. By reporting the condition of the printer 30 to the user both visually and aurally, the printing system 1 and the control program for a printing system can more accurately notify the user of the status of the printer 30.

The printing system 1 and the control program for a printing system can also voice text data in the window data in response to a user operation on the operating unit 18 (see FIG. 6). If the program for the voicing process is currently executing (S41: YES), the printing system 1 and the control program for a printing system can halt voicing by the program for voicing process (S46), thereby preventing voice outputted by the program for the voicing process from overlapping voice outputted by the program for the audio playback process. As a result, the printing system 1 and the control program for a printing system can reliably report the status of the printer 30 to the user through voice.

If the program for the voicing process has begun voicing in response to a user operation (S45: YES) while the program for the audio playback process is outputting voice (S44: YES), the printing system 1 and the control program for a printing system halt the output of voice according to the program for the audio playback process (S46). As a result, the printing system 1 and the control program for a printing system can minimize the period of overlap between voice outputted by the program for the audio playback process and voice outputted by the program for the voicing process. By preventing such voicing overlap, the printing system 1 and the control program for a printing system can reliably report the status of the printer 30 to the user through voice.

The printing system 1 and the control program for a printing system can also set whether or not voice based on the voicing status text data is to be outputted with the program for the audio playback process (S31, S32, S36). In this way, the printing system 1 and the control program for a printing system can perform a setting based on the user's desired usage format.

The printing system 1 and the control program for a printing system also acquire a status code as the status data (S4, S33). As shown in FIG. 12, the status code specifies a condition of the printer 30 that can interfere with printing, such as a paper jam or an out-of-ink error. The printing system 1 and the control program for a printing system can output a display based on display status text data and can output voice based on voicing status text data in response to the status code. Hence, the printing system 1 and the control program for a printing system can promptly and accurately convey a message to the user indicating that a problem has occurred to prevent printing on the printer 30.

Second Embodiment

Next, a second embodiment of the invention will be described while referring to the accompanying drawings. The printing system 1 in the second embodiment has the same basic structure as that described in the first embodiment. Further, control programs used in the printing system 1, such as the programs for the printer control process performed on the printer 30 (see FIG. 4), the voicing process performed on the personal computer 10 (see FIG. 6), and the audio playback process performed on the personal computer 10 (see FIG. 8), have the same content. The program for the status reporting process according to the second embodiment also has the same basic content as that described in FIG. 11. Therefore, a description of these structures and processes will not be repeated.

In the second embodiment, the content of the voice output control process (S37) differs from that in the first embodiment. In other words, the program for this voice output control process differs from the program in the first embodiment described in FIG. 14. Hence, the content of the voice output control process according to the second embodiment will be described in detail.

The program executed by the CPU 12 according to the second embodiment for the voice output control process will be described here. FIG. 15 is a flowchart illustrating steps in this voice output control process.

In the second embodiment, the CPU 12 executes the program for the voice output control process after advancing to S37 in the status reporting process. In S51 at the beginning of the voice output control process according to the second embodiment, the CPU 12 first determines whether the status window 80 has just been changed to the active window 50. The determination process in S51 is identical to that in S41 of the first embodiment and, hence, a description of this determination process will not be repeated. The CPU 12 advances to S52 if the status window 80 has just been changed to the active window 50 (S51: YES). The CPU 12 advances to S53 if the status window 80 has not just been changed to the active window 50 (S51: NO).

When advancing to S52, the CPU 12 determines whether a voicing flag is stored in the RAM 14. Specifically, the CPU 12 references the RAM 14 to determine the existence of this flag. The CPU 12 loops back to S52 if the voicing flag exists in the RAM 14 (S52: YES) and advances to S53 if the voicing flag does not exist in the RAM 14 (S52: NO).

Voice is outputted according to the voicing process (S13, S15). Hence, in S52 the CPU 12 waits until the output of voice based on the status window data in the voicing process is completed before performing subsequent processes in S54 and S55.

On the other hand, when advancing to S53 the CPU 12 executes a process to acquire voicing status text. In this processor the CPU 12 first references the status code stored in the RAM 14. Next, the CPU 12 acquires the main voicing status text data corresponding to the status code from the status database 21. After storing this main voicing status text data in the RAM 14, the CPU 12 ends the process in S53 and advances to S55.

After voice output based on status window data in the voicing process ends, in S54 the CPU 12 executes a process to acquire voicing status text. In this process, the CPU 12 acquires the sub voicing status text data corresponding to the status code from the status database 21. After storing the sub voicing status text data in the RAM 14, the CPU 12 ends the process in S54 and advances to S55.

In S55 the CPU 12 executes a process to transmit a start audio playback command. Specifically, the CPU 12 inputs voicing status text data acquired above and the start audio playback command into the voice control circuit 19. In other words, after performing the process in S53, the CPU 12 inputs the main voicing status text data with a start audio playback command into the voice control circuit 19. On the other hand, after performing the process in S54, the CPU 12 inputs the sub voicing status text data together with the start audio playback command into the voice control circuit 19. After inputting this data into the voice control circuit 19, the CPU 12 ends the process to transmit a start audio playback command (S55) and ends the program for the voice output control process according to the second embodiment.

Therefore, when the CPU 12 inputs the main voicing status text data and the start audio playback command into the voice control circuit 19 in S55 after completing the process in S53, the printing system 1 begins outputting voice based on the main voicing status text data. In other words, the printing system 1 outputs voice indicating the condition of the printer 30 displayed in the status window 80, enabling the user to understand the status of the printer 30 through voice based on the program for the audio playback process.

When the CPU 12 inputs the sub voicing status text data and the start audio playback command into the voice control circuit 19 in S55 after completing the process in S54, the printing system 1 begins outputting voice based on the sub voicing status text data. Hence, the status of the printer 30 displayed in the status window 80 is reported through voice based on the sub voicing status text data.

For example, if the status code "41000" is stored in the RAM 14, the message "Printer is out of paper. Please load more paper." is voiced, enabling the user to learn that the printer 30 is out of paper.

Although the display status text data, main voicing status text data, and sub voicing status text data are all associated with the same status code, as shown in FIG. 12, the condition of the printer 30 based on this status code can be expressed differently. Therefore, the voiced expression of the status performed according to the subsequently executed program for the audio playback process is different from the voiced expression performed earlier by the program for the voicing process. By reporting the status of the printer 30 based on the status code with two different expressions, the printing system 1 can effectively and reliably report the condition of the printer 30 to the user.

When the status code "41000" is stored in the RAM 14, as in the above example, the user can learn that the printer 30 is out of paper through voicing outputted by the program for the voicing process and can further learn what measures to take to resolve this condition through the voice output "Please load more paper."

As described above, when status data is acquired from the printer 30 (S4, S33), the printing system 1 according to the second embodiment and the control program for a printing system acquire voicing status text data corresponding to a status code in the status data from the status database 21 (see FIG. 12; S53, S54). By inputting this voicing status text data into the voice control circuit 19 (S55), the printing system 1 and the control program for a printing system can report the status of the printer 30 by voice (S25). Accordingly, the printing system 1 and the control program for a printing system can report accurate content associated with the state of the printer 30 to the user by voice based on the voicing status text data. As a result, the user can accurately learn the condition of the printer 30 through voice and can take appropriate measures based on this condition.

Further, when status data is acquired, the printing system 1 and the control program for a printing system generate status window data based on this status data. Next, the printing system 1 and the control program for a printing system display the status window 80 on the display unit 15 based on the status window data. At this time, the status text 82 is displayed in the status window 80 based on the display status text data corresponding to the status code. Hence, the printing system 1 and the control program for a printing system can report the condition of the printer 30 to the user through voice based on the voicing status text data and a display based on the display status text data. By reporting the condition of the printer 30 to the user both visually and aurally, the printing system 1 and the control program for a printing system can more accurately notify the user of the status of the printer 30.

The printing system 1 and the control program for a printing system can also launch the program for the voicing process in response to a user operation on the operating unit 18. Specifically, when the user performs an operation to set a window displayed on the display unit 15 to the active window 50, the printing system 1 and the control program for a printing system activate the program for the voicing process in order to voice text data included in the window data (text data displayed in the active window 50; see FIG. 6). If the program for the voicing process is currently voicing data (S51: YES), the printing system 1 and the control program for a printing system delay voicing by the program for the audio playback process (S52). Voicing by the program for the audio playback process is delayed until voicing by the program for the voicing process ends. Hence, even if the user fails to hear voicing by the program for the voicing process, the user can hear voicing by the program for the audio playback process. Thus, the printing system 1 and the control program for a printing system can more reliably report the status of the printer 30 to the user and can prevent voice output by the program for the voicing process from overlapping voice outputted by the program for the audio playback process. As a result, the printing system 1 and the control program for a printing system can reliably report the condition of the printer 30 to the user through voice.

When the program for the voicing process has completed the voicing operation (S52: NO), the printing system 1 and the control program for a printing system acquire sub voicing status text data corresponding to the status code from the status database 21 (S54). Next, the printing system 1 and the control program for a printing system output voice based on this sub voicing status text data (S25, S55). Voicing based on the sub voicing status text data has a different expression from that outputted by the program for the voicing process (see FIG. 12). Hence, the printing system 1 and the control program for a printing system can effectively convey to the user content based on voice according to the audio playback process and content based on voice according to the voicing process. In other words, the printing system 1 and the control program for a printing system can effectively and reliably notify the user of the condition of the printer 30 through voice.

The printing system 1 and the control program for a printing system can also set whether or not voice based on the voicing status text data is to be outputted with the program for the audio playback process (S31, S32, S36). In this way, the printing system 1 and the control program for a printing system can perform a setting based on the user's desired usage format.

The printing system 1 and the control program for a printing system also acquire a status code as the status data (S4, S33). As shown in FIG. 12, the status code specifies a condition of the printer 30 that can interfere with printing, such as a paper jam or an out-of-ink error. The printing system 1 and the control program for a printing system can output a display based on display status text data and can output voice based on voicing status text data corresponding to the status code. Hence, the printing system 1 and the control program for a printing system can promptly and accurately convey a message to the user indicating that a problem has occurred to prevent printing on the printer 30.

While the invention has been described in detail with reference to the above embodiments thereof, it would be apparent to those skilled in the art that various changes and modifications may be made therein without departing from the spirit of the invention.

While the printing system 1 is provided with a single status database 21 in the first and second embodiments described above, the invention is not limited to this configuration. That is, the printing system 1 may be provided with a plurality of status databases 21. For example, the printing system 1 may be provided with a first status database correlating status codes with display status text data, and a second status database correlating status codes with main voicing status text data and sub voicing status text data. Further, while the personal computer 10 is provided with the status database 21 in the embodiments described above, the printer 30 may also possess a status database.

The personal computer 10 may store a set of text data associating with the status code. The set of text data includes text. In this case, the personal computer 10 uses the text included in the set of text data as display status text, main voicing status text, and sub voicing status text. That is, the set of text data is used as the message text data. Alternatively, the personal computer 10 may stores general data assigning with the status code. The general data is original data for text. That is, the personal computer 10 edits or converts the general data and obtains display status text, main voicing status text, sub voicing status text. In other words, the personal computer 10 obtains the message text data by editing or converting the general data.

Further, while the format (e.g., the volume, toner playback speed, and monaural/stereo setting) for voice outputted by the program for the audio playback process and the format for voice outputted by the program for the voicing process are not particularly stipulated in the embodiments, it is possible to output voice using different tonal qualities. For example, the program for the audio playback process could output data in a male voice, while the program for the voicing process could output data in a female voice. Alternatively, the program for the audio playback process could output data at a low volume, while the program for the voicing process could output data at a high volume. Similarly, the program for the audio playback process could output voice in a monaural format, while the program for the voicing process could output voice in a stereo format. Through these different sound formats, the user can easily differentiate the voice output based on the different tonal qualities of outputted voice.

As shown in FIG. 12, the printing system according to the embodiments described above can acquire different status codes indicating the same problem but a different degree, such as the status code "10006" indicating that the residual ink is getting low and the status code "40038" indicating that the printer is out of ink. Here, the printing system may be configured to modify the format of outputted voice reporting different degrees of the same problem. For example, data based on the status code "10006" could be outputted in a male voice, while data based on the status code "40038" could be outputted in a female voice. The format of outputted voice may be easily modified by adding data to the status code indicating the severity of the problem. Further, while the printing system 1 and the control program for a printing system are described in the embodiments, the invention may also be applied to a print data processor (the personal computer 10, for example) and to a control program on the print data processor.

Further, while the CPU 12 determines in S41, S45, and S51 whether the status window 80 has been made active in the embodiments described above, the invention is not limited to this configuration. As described above, the processes performed in S41, S45, and S51 serve to determine whether the program for the voicing process has begun or is about to begin voicing. Hence, the specific determination reference in S41, S45, and S51 can be suitably modified, provided that the CPU 12 can determine the state of voicing in the voicing process. For example, the content of the determination processes in S41, S45, and S51 may be changed such that the CPU 12 determines whether the control 60 in the active window 50 has been set to the focus control 65 or both whether the status window 80 has been made active and whether the focus control 65 exists in the status window 80.

What is claimed is:

1. A printing system comprising:
a printing device that is configured to perform printing operation by using consumables; and
a printing data processing device,
wherein the printing device comprises:
a status data generating unit that generates status data indicating a status of the printing device; and
a transferring unit that transfers the status data, and
wherein the printing data processing device comprises:
a receiving unit that receives the status data from the transferring unit;
a status text storing unit that stores status text data corresponding to the status data, the status text data explanatorily indicating the status of the printing device corresponding to the status data with words;
a first voicing unit that voices text;
an acquiring unit that acquires the status text data corresponding to the status data from the status text storing unit; and
an inputting unit that inputs voicing text data that is based on the acquired status text data into the first voicing unit, wherein the first voicing unit voices text based on the inputted voicing text data.

2. The printing system according to claim 1, wherein the printing data processing device further comprises:
a display unit that displays a window;
a window data storing unit that stores window data having information about the window, the window data being used to display the window on the display unit; and
an editing unit that edits the window data to include window text data based on the acquired status text data,
wherein the display unit displays the window on the display unit based on the edited window data.

3. The printing system according to claim 2, wherein the printing data processing device further comprises:
a second voicing unit that voices text based on the window text data that is included in the window data;
a first determining unit that determines whether the second voicing unit is currently voicing text; and
a restricting unit that restricts the inputting unit to input the voicing text data into the first voicing unit if the first determining unit determines that the second voicing unit is currently voicing text.

4. The printing system according to claim 3, wherein the restricting unit stops the inputting unit to input the voicing text data into the first voicing unit if the first determining unit determines that the second voicing unit is currently voicing text.

5. The printing system according to claim 3, wherein the restricting unit delays the inputting unit to input the voicing text data into the first voicing unit if the first determining unit determines that the second voicing unit is currently voicing text.

6. The printing system according to claim 5, wherein the printing data processing device further comprises a second determining unit that determines whether the second voicing unit has finished voicing text,
wherein if the second determining unit determines that the second voicing unit has finished voicing text, the restricting unit releases the inputting unit and the inputting unit inputs the voicing text data into the first voicing unit.

7. The printing system according to claim 3, wherein the status text data comprises a plurality of sets of status text data corresponding to the status data,
wherein the editing unit edits the window data to include one set of status text data among the plurality of sets of the status text data corresponding to the status data,
wherein if the first determining unit determines that the second voicing unit is not voicing text, the acquiring unit acquires another set of status text data that is different from the one set of status text data among the plurality of sets of the status data corresponding to the status data and the inputting unit inputs the another set of status text data as the voicing status text data into the first voicing unit.

8. The printing system according to claim 3, wherein the data processing device further comprises:
a third determining unit that determines whether the first voicing unit is currently voicing text;
a fourth determining unit that determines whether the window is active,
wherein the fourth determining unit performs the determination if the first determining unit determines that the second voicing unit is not voicing text and if the third determining unit determines that the first voicing unit is currently voicing text,
wherein the restricting unit stops the input unit to input the voicing text data that is based on the status text data into the first voicing unit if the fourth determining unit determines that the window corresponding to the window data that includes the window text data based on the status text data is active.

9. The printing system according to claim 1, wherein the data processing device further comprises:
a setting unit that sets to voice or not to voice text by the first voicing unit; and
a control unit that controls the inputting unit to input or not to input the voicing status text data based on the setting by the setting unit.

10. The printing system according to claim 1, wherein the status data comprises error status data indicating that the printing device has a failure in printing operation.

11. A non-transitory computer-readable storage medium storing a set of program instructions executed by a computer for controlling a printing system that comprises a printing device and a printing data processing device, the printing device being configured to perform printing operation by using consumables, the printing device comprising a status data generating unit and a transferring unit, the status data generating unit generating status data indicating a status of the printing device, the transferring unit transferring the status data, the printing data processing device comprising a receiving unit and a status text storing unit, the receiving unit receiving the status data from the transferring unit, the status text storing unit storing status text data corresponding to the status data, the status text data explanatorily indicating the status of the printing device corresponding to the status data with words, the program instructions comprising:
(a) voicing text;

(b) acquiring the status text data corresponding to the status data from the status text storing unit; and (c) inputting voicing text data that is based on the acquired status text data into the voicing instruction (a), wherein the voicing instruction (a) voices text based on the inputted voicing text data.

12. The computer-readable storage medium according to claim 11, wherein the printing data processing device further comprises a display unit and a window data storing unit, the display unit displaying a window, the window data storing unit storing window data having information about the window, the window data being used to display the window on the display unit, the instructions further comprising:
(d) editing the window data to include window text data based on the acquired status text data,
(e) displaying the window on the display unit based on the edited window data.

13. The computer-readable storage medium according to claim 12, the instructions further comprising:
(f) voicing text based on the window text data that is included in the window data;
(g) determining whether the voicing instruction (f) is currently voicing text; and
(h) restricting the inputting instruction (c) to input the voicing text data into the voicing instruction (a) if the determining instruction (g) determines that the voicing instruction (f) is currently voicing text.

14. The computer-readable storage medium according to claim 13, wherein the restricting instruction (h) stops the inputting instruction (c) to input the voicing text data into the voicing instruction (a) if the determining instruction (g) determines that the voicing instruction (f) is currently voicing text.

15. The computer-readable storage medium according to claim 13, wherein the restricting instruction (h) delays the inputting instruction (c) to input the voicing text data into the voicing instruction (a) if the determining instruction (g) determines that the voicing instruction (f) is currently voicing text.

16. The computer-readable storage medium according to claim 15, the instructions further comprising (i) determining whether the voicing instruction (f) has finished voicing text,
wherein if the determining instruction (i) determines that the voicing instruction (f) has finished voicing text, the restricting instruction (h) releases the inputting instruction (c) and the inputting instruction (c) inputs the voicing text data into the voicing instruction (a).

17. The computer-readable storage medium according to claim 13, wherein the status text data comprises a plurality of sets of status text data corresponding to the status data,
wherein the editing instruction (d) edits the window data to include one set of status text data among the plurality of sets of the status text data corresponding to the status data,
wherein if the determining instruction (g) determines that the voicing instruction (f) is not voicing text, the acquiring instruction (b) acquires another set of status text data that is different from the one set of status text data among the plurality of sets of status text data corresponding to the status data and the inputting instruction (c) inputs the another set of voicing status text data as the voicing text data into the voicing instruction (a).

18. The computer-readable storage medium according to claim 13, the instructions further comprising:
(j) determining whether the voicing instruction (a) is currently voicing text;
(k) determining whether the window is active,
wherein the determining instruction (k) performs the determination if the determining instruction (g) determines that the voicing instruction (f) is not voicing text and if the determining instruction (j) determines that the voicing instruction (a) is currently voicing text,
wherein the restricting instruction (h) stops the inputting instruction (c) to input the voicing text data that is based on the status text data into the voicing instruction (a) if the determining instruction (k) determines that the window corresponding to the window data that includes the window text data based on the status text data is active.

19. The computer-readable storage medium according to claim 11, the instructions further comprising:
(l) setting to voice or not to voice text by the voicing instruction (a); and
(m) controlling the inputting instruction (c) to input or not to input the voicing status text data based on the setting by the setting instruction (l).

20. The computer-readable storage medium according to claim 11, wherein the status data comprises error status data indicating that the printing device has a failure in printing operation.

* * * * *